Dec. 11, 1962  C. N. JORGENSEN ET AL  3,067,930
ACCOUNTING MACHINE RECORDING CONTROL MEANS
Filed Oct. 30, 1959  13 Sheets-Sheet 1

INVENTORS
CHESTER N. JORGENSEN
EDWARD S. STORK
LLOYD D. TURNER

BY

THEIR ATTORNEYS

Dec. 11, 1962 C. N. JORGENSEN ETAL 3,067,930
ACCOUNTING MACHINE RECORDING CONTROL MEANS
Filed Oct. 30, 1959 13 Sheets-Sheet 4

INVENTORS
CHESTER N. JORGENSEN
EDWARD S. STORK
LLOYD D. TURNER

BY Louis A. Kline
Albert L. Sessler, Jr.
THEIR ATTORNEYS

Dec. 11, 1962   C. N. JORGENSEN ETAL   3,067,930
ACCOUNTING MACHINE RECORDING CONTROL MEANS
Filed Oct. 30, 1959   13 Sheets-Sheet 5

INVENTORS
CHESTER N. JORGENSEN
EDWARD S. STORK
LLOYD D. TURNER
BY
Louis A. Kline
Albert L. Sessler
THEIR ATTORNEYS

INVENTORS
CHESTER N. JORGENSEN
EDWARD S. STORK
LLOYD D. TURNER
THEIR ATTORNEYS

Dec. 11, 1962     C. N. JORGENSEN ETAL     3,067,930
ACCOUNTING MACHINE RECORDING CONTROL MEANS
Filed Oct. 30, 1959     13 Sheets-Sheet 7

| NUMERALS | DATE | BALANCE |
|---|---|---|
| | JAN 1 57 | 6,392.53 |
| | JAN 31 57 | 7,283.45 |

| NUMERALS TOTALS | | |
|---|---|---|
| THIS MONTH | | |
| PREVIOUS | | NET INTEREST |
| TO DATE | | |
| INTEREST | CR. | DR. |

| CALCULATED BY: | CHECKED BY: | ENTERED BY: |
|---|---|---|

INVENTORS
CHESTER N. JORGENSEN
EDWARD S. STORK
LLOYD D. TURNER

BY *Louis J. Kline*
*Albert L. Sessler, Jr.*

THEIR ATTORNEYS

Dec. 11, 1962     C. N. JORGENSEN ETAL     3,067,930
ACCOUNTING MACHINE RECORDING CONTROL MEANS
Filed Oct. 30, 1959     13 Sheets-Sheet 8

INVENTORS
CHESTER N. JORGENSEN
EDWARD S. STORK
LLOYD D. TURNER

BY

THEIR ATTORNEYS

Dec. 11, 1962 C. N. JORGENSEN ETAL 3,067,930
ACCOUNTING MACHINE RECORDING CONTROL MEANS
Filed Oct. 30, 1959 13 Sheets-Sheet 9
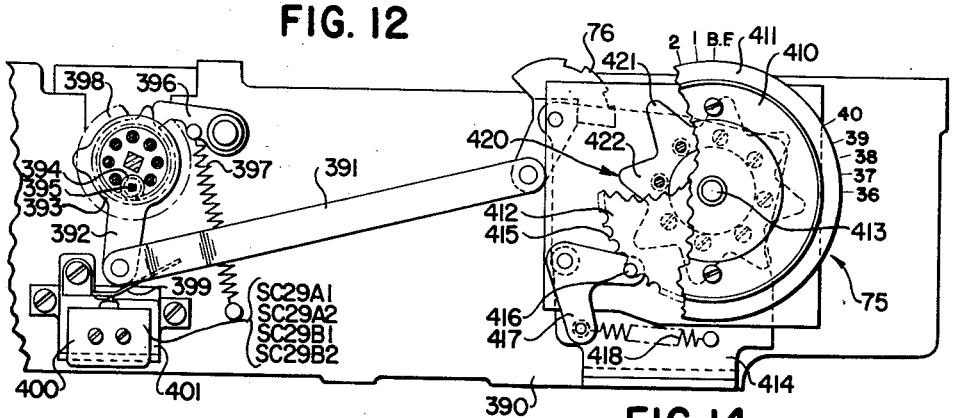
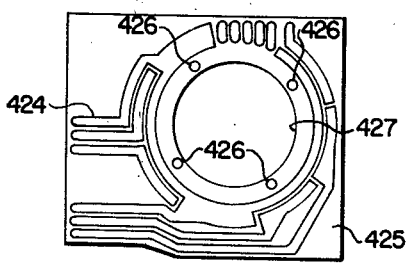
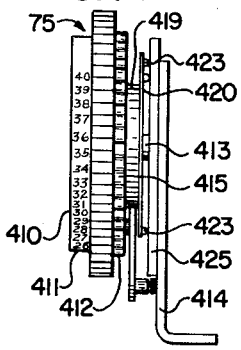
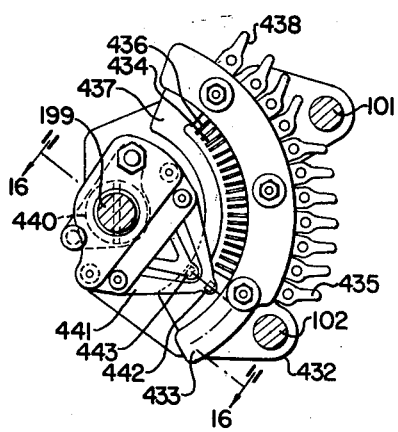
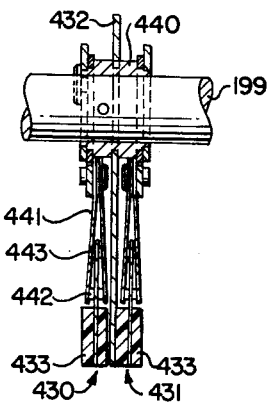
INVENTORS
CHESTER N. JORGENSEN
EDWARD S. STORK
LLOYD D. TURNER
BY
THEIR ATTORNEYS Dec. 11, 1962 C. N. JORGENSEN ET AL 3,067,930
ACCOUNTING MACHINE RECORDING CONTROL MEANS
Filed Oct. 30, 1959 13 Sheets-Sheet 10

INVENTORS
CHESTER N. JORGENSEN
EDWARD S. STORK
LLOYD D. TURNER
BY
THEIR ATTORNEYS

Dec. 11, 1962 C. N. JORGENSEN ETAL 3,067,930
ACCOUNTING MACHINE RECORDING CONTROL MEANS
Filed Oct. 30, 1959 13 Sheets-Sheet 11

INVENTORS
CHESTER N. JORGENSEN
EDWARD S. STORK
LLOYD D. TURNER
BY
THEIR ATTORNEYS

Dec. 11, 1962  C. N. JORGENSEN ETAL  3,067,930
ACCOUNTING MACHINE RECORDING CONTROL MEANS
Filed Oct. 30, 1959  13 Sheets-Sheet 13

INVENTORS
CHESTER N. JORGENSEN
EDWARD S. STORK
LLOYD D. TURNER
BY
Louis A. Kline
Albert L. Sessler, Jr.
THEIR ATTORNEYS

United States Patent Office 3,067,930
Patented Dec. 11, 1962

3,067,930
ACCOUNTING MACHINE RECORDING
CONTROL MEANS
Chester N. Jorgensen and Edward S. Stork, Dayton, and
Lloyd D. Turner, Brookville, Ohio, assignors to The
National Cash Register Company, Dayton, Ohio, a corporation of Maryland
Filed Oct. 30, 1959, Ser. No. 849,883
7 Claims. (Cl. 235—60.3)

This invention relates generally to accounting machines which operate in conjunction with magnetically coded ledger cards to enable the picking up of an old balance and other information from a ledger card and the subsequent recording of a new balance and other information on the ledger card at the end of an accounting transaction. In particular, the invention relates to such a machine in which an additional printing operation on an additional separate record member may be accomplished in connection with each accounting transaction, in which reference information is printed on certain record members, and in which identification information may be printed in connection with each accounting transaction on a continuuos record member maintained within the accounting machine.

The present invention is adapted for use with an accounting machine of the type disclosed in the United States patent application Serial No. 610,754, filed September 19, 1956, by inventors Konrad Rauch et al., now United States Patent No. 2,947,475, issued August 2, 1960, but is not intended to be limited to use with such a machine.

In the above-cited patent application, the accounting machine there shown is capable of comparing a comparator number, such as an account number, manually set up on the machine for the first item entry in each accounting transaction with the corresponding account number magnetically encoded on the ledger card. However, while comparison of account numbers could be made in that machine, no provision was made for the printing of the account number which was magnetically sensed from the ledger card on any of the various record members used in connection with the accounting machine. In many accounting systems, in order that each transaction may be related to a particular account, it is desirable that the account number which is sensed from the ledger card be printed on the journal sheet generated by the accounting machine on which is maintained a running record of all of the accounting transactions. In addition, it has been found desirable in certain accounting systems to effect the generation of an additional ledger card, of different size than the magnetically encoded ledger card, and bearing only a portion of the information contained on the magnetically encoded ledger card.

The present invention provides means for accomplishing both of these desirable functions. By means of a novel dual use of the signal sensed from the magnetically encoded ledger card during pickup of information therefrom, it has been made possible to effect the printing of the sensed account number on the journal sheet. In connection with this, various interlocks are provided to insure that the machine will not print incorrect account information, and that other information, such as date information, must be properly indexed before the machine will operate.

Furthermore, various sequencing and control means have been provided so that information sensed by the machine from a first ledger card, which is then withdrawn from the machine, may be recorded upon a second ledger card of a different type, which is subsequently introduced into the accounting machine, with certain of the printing means of the machine disabled, so that only the desired information is printed. Also, in connection with the printing upon this second record card, control means are provided to enable the proper line on said card to be selected for printing.

Accordingly, it is an object of the present invention to provide an accounting machine capable of sensing an old balance and a control number from a ledger card, printing the sensed control number on a journal, accepting additional amount entries, computing a new balance, recording said new balance on the ledger card, and also recording the balance information on an additional record member inserted into the machine.

A further object of the invention is to provide an accounting machine capable of sensing a control number from a first type of record member and recording the sensed control number on a second type of record member.

An additional object is to provide an accounting machine capable of sensing a control number from a first type of record member and recording the sensed control number on a second type of record member in a location determined by a setting of locating means associated with the accounting machine.

Another object of the invention is to provide an accounting machine capable of sensing a control number from a first type of record member and recording the sensed control number on a second type of record member, and also capable of preventing the recording when appropriate or desired.

Still another object of the invention is to provide an accounting machine capable of accepting information from encoded record members and from manual input means, utilizing said information, and recording the results of the utilization of said information on a plurality of record members, and including means preventing further operation of the accounting machine in the event of incorrect input of information.

With these and other objects, which will become apparent from the following description, in view, the invention includes certain novel features of construction and combinations of parts, a preferred form or embodiment of which is hereinafter described with reference to the drawings which accompany and form a part of this specification.

In the drawings:

FIG. 12 is a detail view showing a portion of the structure of the manual line finding knob, and also showing the numerals transfer switch knob, and the means controlled thereby.

FIG. 13 is a detail view showing a printed circuit board used in connection with the manual line finding knob.

FIG. 14 is an end view of the manual line finding knob and associated mechanism.

FIG. 15 is a detail view showing switching means used in connection with the line finding means of the present invention.

FIG. 16 is an enlarged sectional view of the switching means, taken along line 16—16 of FIG. 15.

GENERAL DESCRIPTION

Figure 1:
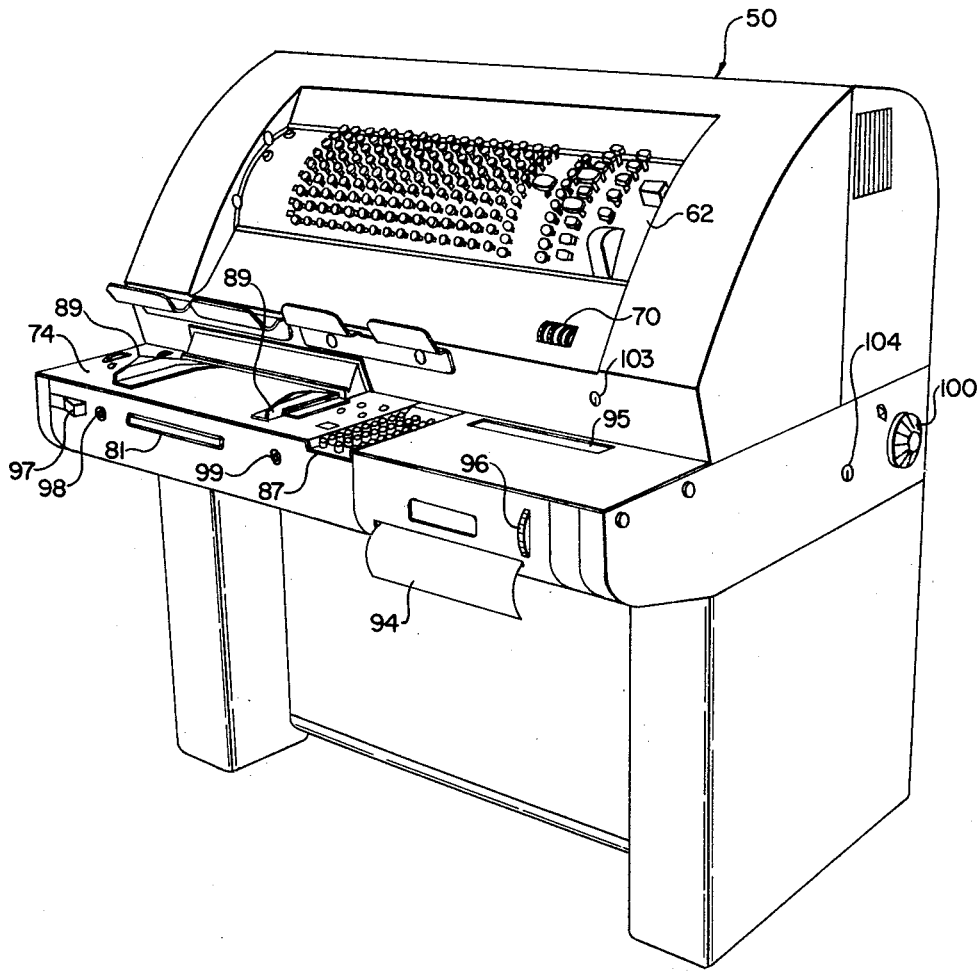
FIG. 1 is a perspective view of the machine embodying the present invention.

The present invention is shown embodied herein in an accounting machine of the type described and claimed in the previously-mentioned United States patent application Serial No. 610,754, filed September 19, 1956, by Konrad Rauch et al., which is controlled from a ledger card on which are printed the usual amounts pertaining to the account, such as the checks and deposits, the balances after each transaction entry, the sign of the balance, the date, etc. In addition, the ledger card has recorded thereon magnetically the last balance and related data, such as a comparator number, which in this case is the account number; the sign of the balance; and the number of the line on which the next entry is to be printed on the ledger card.

A plurality of sensing and recording heads are provided on the accounting machine of the previously-mentioned application Serial No. 610,754 for sensing the data which is magnetically encoded on the ledger card, and for erasing previously-stored data and recording new data thereon. The heads are electrically connected to data-retaining means in the accounting machine, so that data on the ledger card may be entered into the accounting machine, and so that data produced by the accounting machine may be recorded on the card. The machine is also controlled from a keyboard, on which data may be set to be printed on the card and to be combined with data read from the card to form new balances. In a new balance recording operation, the data pertaining to the new balances is printed on the ledger cards, the previous magnetically-stored data is erased, and the new balance and related data pertaining to the new balance are magnetically stored on the card in its place.

In addition to the usual interlocks which have been previously provided on bank posting machines, the machine described and claimed in the previously-cited application is provided with further safeguards to insure correctness of the pickup operation. One of these safeguards is a check to be sure that all of the data has been sensed or read from cards. Failure to read any data will prevent the entry of the remaining data into the machine and will cause the card to be immediately fed from the machine.

Another of these safeguards is a check to be sure that the data which was read has been correctly entered into the machine by comparing the data actually set in the machine with the data actually recorded on the card. This is accomplished by first reading the ledger card and controlling the setting of the machine according to the data which was read and then reading the card a second time and comparing the second reading with the actual setting of the machine. If there is no agreement, the further normal operation of the machine is prevented, and only a corrective operation of the machine may take place.

A further safeguard cooperates with the above two safeguards to insure that over-printing on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in the printing position.

The accounting machine is provided with a further safeguard to insure correctness of entries. As previously described, a comparator keyboard is provided, on which a comparator number, such as the account number, may be set, and the number thus set up can be compared with the number read from the ledger card to insure that the check or the deposit is being posted to the correct account. Failure of the numbers to agree will cause the card to be fed from the machine immediately and will prevent the data from being entered into the machine.

These automatic safeguards and checking means, together with the usual interlocks and controls, insure virtually "error proof" operations without the necessity of running proofs on work already performed.

The machine described in the previously-cited application is provided with a data storage means, in which the balance is stored when it is read, and in which it is retained until it is determined that something has been read from each channel on the card and that there has been agreement between the account number read from the card and that set in the account number keyboard. If data was read from each channel on the card, and if the account numbers agree, then the balance is entered into the totalizer of the machine under control of the data storage means. If there is a failure to read data from any channel on the card, or if the account numbers do not agree, the card is immediately fed from the machine, as indicated above, and the balance is not entered into the totalizer of the machine. By thus storing the balance until it is determined that data has been read from all of the channels on the card, and until it is determined that there is agreement between the account numbers, incorrect entries and corrective operations of the machine are minimized.

This storage of the balance until the account number has been determined also enables a "stop payment" signal to be obtained to call the operator's attention to the fact that a "stop payment" order has been placed on the account and to enable the operator to examine the check, before the entry is made into the totalizer, to see whether it is the check upon which the "stop payment" was placed. This is accomplished by recording the "stop payment" number on the ledger card instead of the account number, so that the comparator mechanism will show a failure of comparison and will prevent the entry of the balance whenever it is attempted to post to the account in the usual manner. Upon verification that the check is not the one against which the "stop payment" order has been placed, it may be posted by setting the "stop payment" number in the comparator keyboard and operating the machine in the usual manner. In this manner, the posting of a check on which a "stop payment" order has been placed is prevented.

The accounting machine is also provided with extremely flexible controls which enable it to perform different types of operations involving reading and recording operations on the card. For example, with one setting of the controls, the card reading operation may be eliminated, and data may be set up on the keys of the machine and recorded magnetically on the card. With another setting of the controls, a normal posting operation may take place involving the reading of the card to pick up the old balance, the entering of checks and/or deposits by operating the machine under the control of the keys, and the recording of the new balance on the card. With a further setting of the controls, the machine may be controlled to transfer certain stored data from one card to another, as at the end of the month or accounting period, and in this operation data is read from a card and set up in the machine, the old card is removed from the machine and a new card is put into the machine, and certain of the data which was read is recorded on the card. With still a further setting, the controls will be effective to cause the machine described in the previously-mentioned United States Patent application, Serial No. 610,754, to operate in a trial balance operation, in which the stored data is read, the old balance and the check count are entered into the machine, and the card is ejected without erasure of the stored data or recording of any further data thereon. It may be noted, however, that the check count information is not included in systems utilizing machines embodying the present invention.

For a more detailed description of construction and operation of those parts of the accounting machine which do not form a part of the present invention, reference may be had to the previously-mentioned United States Patent application, Serial No. 610,754.

In the machine of the present invention, certain of the data to be stored upon the magnetic ledger cards has been changed, as will subsequently appear. Also structural changes have been made to permit the printing of an account number on the accounting machine journal strip, and to enable the performance of a "numerals transfer" operation. This latter operation enables the accounting machine to provide an additional record member, called a numerals card, on which information including an amount or balance and the date of the entry is recorded. Such a record member is required in certain types of accounting systems.

DETAILED DESCRIPTION

Ledger Card

An accounting machine 50 embodying the present invention is shown in perspective in FIG. 1 and, as previously indicated, is adapted to be controlled by data magnetically recorded on a ledger card 51 (FIG. 4) having means thereon to store this data.

The ledger card 51 which is used to control entries into the machine 50 is vertically lined on its front side to provide a plurality of columns for receiving records of entries. In its normal use, after the card is completed, or at the end of an accounting period, it is separated into two parts along a line 52, one of which parts will be sent to the customer, and the other of which parts will remain with the organization using the machine, for record-keeping purposes. Accordingly, the columns on one side of the line 52 are the same as the columns on the other side of the line 52, and these columns include spaces for "Reference No.," "Checks," "Deposits," "Date," and "Balance." All of the information relating to the various columns on both sides of the line 52 is mechanically printed upon the ledger card by the accounting machine during its operation. Typical numerical entries are printed for purpose of illustration upon certain lines in the ledger card 51 shown in FIG. 4.

The card 51 is provided on its rear side with ten strips or areas 53, of magnetizable material, which can be distinctly magnetized to represent data. Each area 53 may provide two channels in which data can be stored, which data can be used to control the machine to enter the data therein or to provide other related controls.

In order that the card 51 may be clamped securely to the card carriage of the accounting machine 50, and in order that the card may be aligned properly with the printing mechanism of such machine and with the reading and recording heads thereof, the carriage is provided with locating pins adapted to cooperate with openings 54 near the top of the card, to insure that the card will be fed into and out of the machine in proper alignment with the heads and the printing mechanism. The holes 54 not only insure that the ledger card 51 is correctly positioned with respect to the reading and recording heads 55 (FIG. 9) and with respect to the printing mechanism of the accounting machine, but also insure that the ledger card is positioned on the card carriage right side up, the intermediate hole 54 being offset from the center of the card. This intermediate hole 54 acts as the main locating hole, and the two side holes 54 are elongated to allow for slight changes in the width of the ledger card due to temperature and humidity changes and to provide greater bearing area between the pins and the card.

Numerals Card

Figures 7, 8:
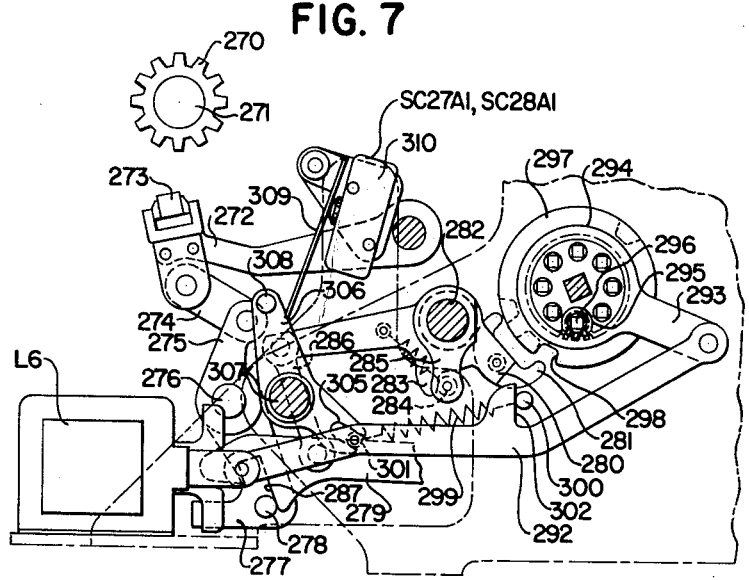
FIG. 7 is a detail view showing the solenoid control means for the journal printing mechanism, for controlling printing of the account number on the journal sheet.
FIG. 8 is a view showing a typical numerals card used in an accounting system for which the machine of the present invention is adapted.

Also used in an accounting system for which the machine embodying the present invention is especially adapted, is a numerals card 58, shown in FIG. 8. This card is provided, on its front side, with various columns in which information may be imprinted by the accounting machine, and in which typical numerical entries are printed for purpose of illustration in FIG. 8. The numerals card has no provision for magnetic encoding of information thereon. Near the top of the numerals card are provided two openings 59, which cooperate with certain of the locating pins on the card carriage to insure that the numerals card will be properly positioned and carried in the accounting machine for printing thereon. It will be noted that the numerals card is about half the size of the ledger card. Printing is accomplished on the numerals card by certain of the same printing means which are used to print on the ledger card, and it will be seen that, accordingly, certain others of the printing means used for the ledger card must be disabled when the numerals card is printed. Means for accomplishing this will be described subsequently in this specification, as will the manner in which the ledger card and the numerals card are utilized together with the accounting machine 50 to provide the desired records for the accounting transaction according to the particular accounting system which uses these record members.

Keyboard

Figure 2:
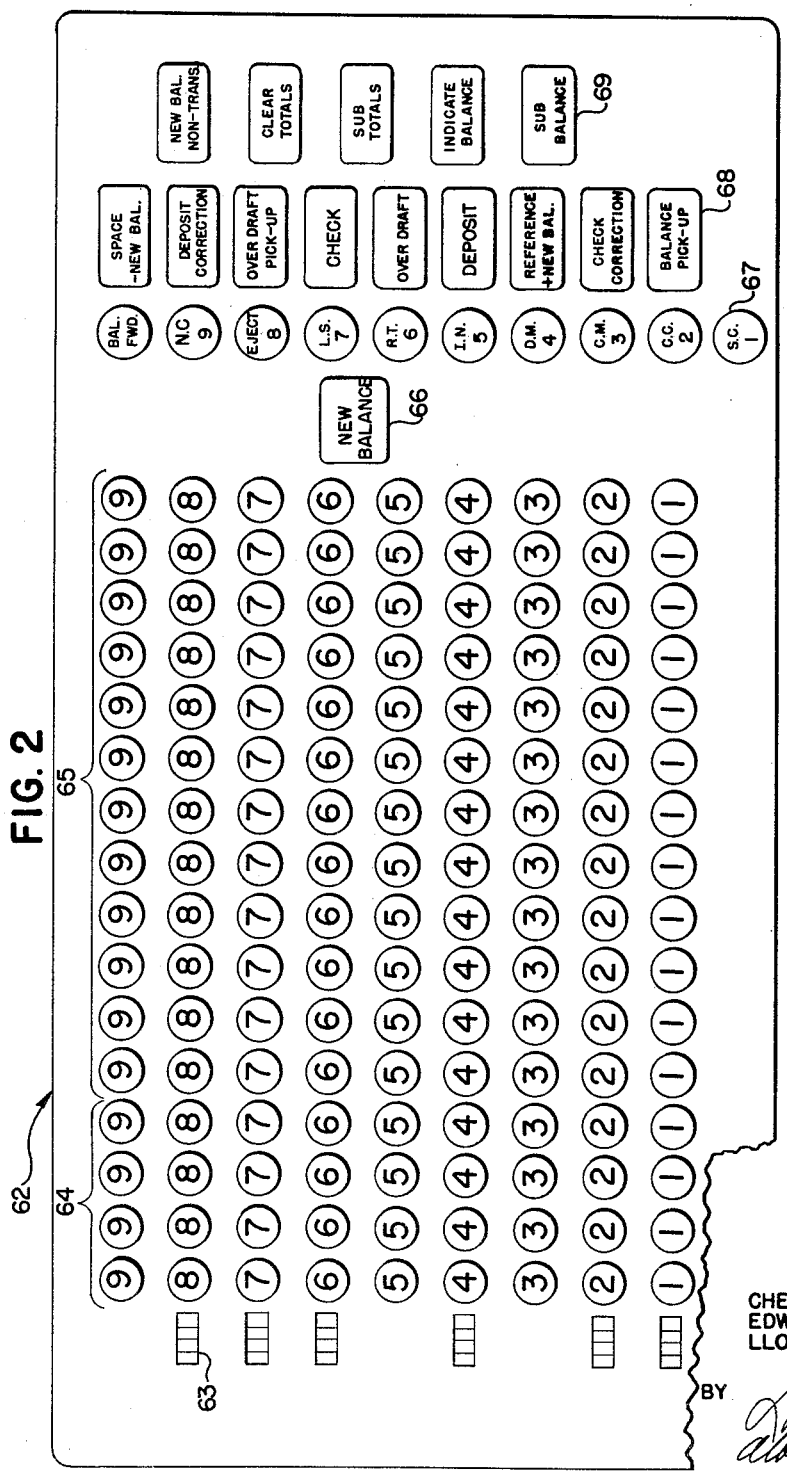
FIG. 2 is a diagrammatic view of the amount and control keyboard for the machine.

The accounting machine embodying the present invention is provided with a keyboard 62, shown diagrammatically in FIG. 2.

At the extreme left of the keyboard, as viewed in FIG. 2, are a plurality of visible item counters 63, which function to keep total records of various types of transactions. Since these counters form no part of the present invention, no further reference thereto will be made.

The left-most four rows of keys 64 are used for indexing into the machine a reference number which is associated with each check or deposit item. The differential mechanisms of the corresponding rows of the machine are operated in accordance with the information entered thereon by the keys 64 in order to enter such information into the machine for printing purposes. These differential mechanisms may also be independently controlled to print account numbers sensed from the ledger cards 51, as will subsequently be described.

The next twelve rows of keys are amount keys 65, which are used for setting up amounts, such as old balances, the amounts of checks and deposits, and any other desired information used in connection with the banking business, which information is represented by dollars and cents or any other numbers.

A new balance key 66 is provided on the keyboard 62 for initiating a new balance operation of the accounting machine. As will subsequently be described, an additional new balance key for the same purpose is provided on the lower control panel.

The rows of keys 67, 68 and 69 are control keys in control rows 3, 2 and 1, respectively, for controlling the various operations of the machine.

Below the right side of the keyboard proper, as shown in FIG. 1, are a plurality of date selecting knobs 70, positioned so that a portion of the periphery of each knob extends through an opening in the housing of the machine 50, in order that the correct date may be set up for printing on the various record members.

Lower Control Panel

Figure 3:
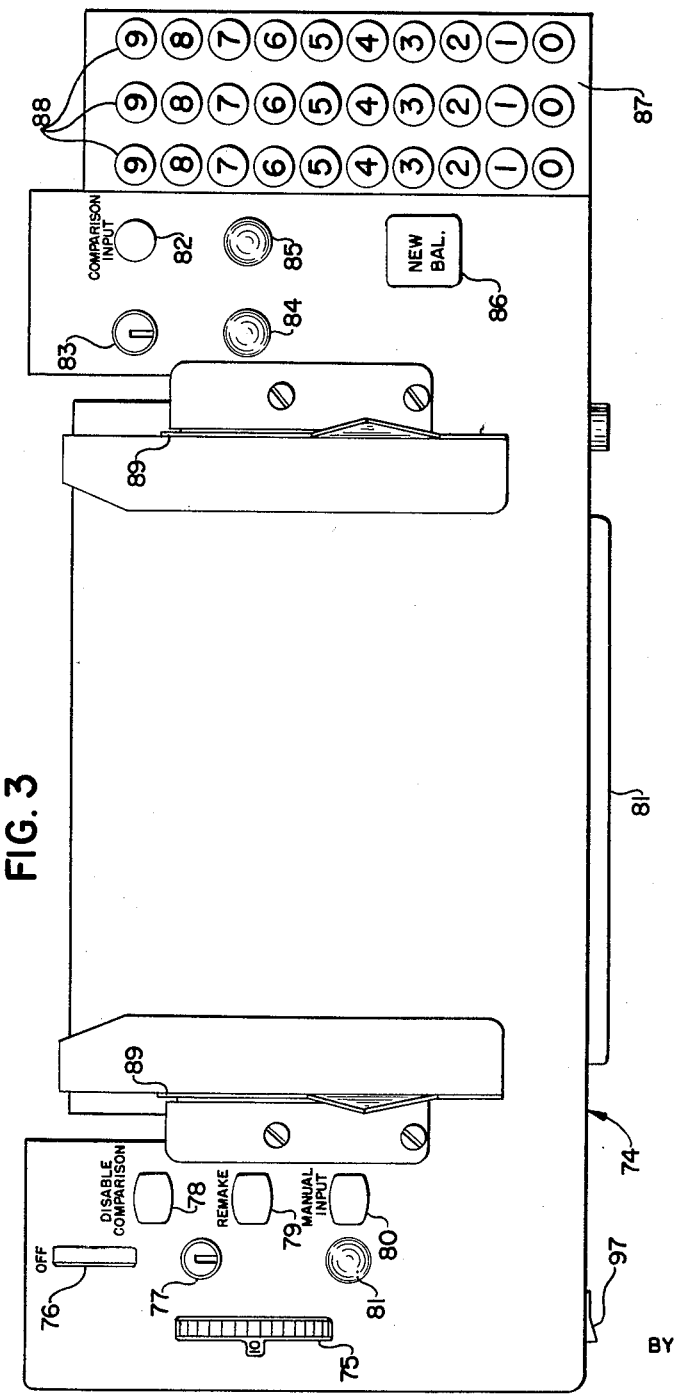
FIG. 3 is a diagrammatic view of the lower control panel of the machine, including the comparator keyboard.

As shown in FIGS. 1 and 3, the machine is also provided with additional control means located in a lower control panel 74, horizontally positioned below the keyboard 62, as shown in FIG. 1. At the left side of the panel 74 is a manual line-finding knob 75, which may be rotated to select the desired line on a ledger card or numerals card inserted manually into the machine. Above and to the right of the knob 75 is a two-position numerals transfer switch 76 used in numerals transfer operations, as will subsequently be more fully described. To the right of the switch 76 in vertical linear relation are three keys 78, 79 and 80, controlling the following functions: disable comparison, remake, and manual input. A lock 77 is provided to prevent depression of the keys 78, 79 and 80 except under control of authorized personnel. An indicator 81 is provided to show when the manual input switch 80 is depressed.

As may be seen most clearly in FIG. 1, the central portion of the lower control panel 74 is given over to providing a surface for positioning and movement of the ledger card 51 being operated upon by the machine. Guides 89 are provided on this surface to facilitate placement of the ledger cards. Located below this surface on the machine is a pickup bar 81 which is operated to initiate a balance pickup operation of the machine.

To the right of the central portion on the panel 74 may be seen a comparator input key 82, which may be secured against operation by a lock 83. Indicators 84 and 85 are provided in association with the comparator input key.

Below the indicators 84 and 85 is positioned a new balance key 86. As previously stated, either this key or the key 66 on the keyboard 62 may be used to initiate a new balance operation.

At the extreme right of the lower control panel is a comparator keyboard 87, utilizing three rows or banks of keys 88. A comparator number relating to each check and deposit item, or certain of the check and deposit items, may be indexed on the comparator keyboard 87 by means of the keys 88, and is then compared in the machine with a comparator number sensed by the machine from the ledger card operated on. The two comparator numbers must agree in order for the machine to continue its cycle of operation.

As may be seen in FIG. 1, to the right of the comparator keyboard is located a housing for the journal sheet 94 on which an internal record of all the transactions carried through by the machine is kept. Printing means, which will be subsequently described, are provided for printing certain information relating to each transaction on the journal sheet 94, including the account number of each transaction. A window 95 is provided in the machine so that the information being printed upon the journal sheet is visible to the operator, and a manually operable advancing knob 96 is provided to facilitate withdrawal of the journal sheet from the machine when desired.

At the extreme left front of the machine as viewed in FIG. 1, below the lower control panel 74, is located the main power switch 97, which is operated to control power to the accounting machine. To the right of the power switch 97 is a lock 98 which may be operated to lock the power switch 97 in either the "off" or the "on" position.

Located to the right of the pickup bar 81, below the lower control panel 74, is a gripper release button 99. This button may be operated to control the release of the ledger card or the numerals card by the machine when desired.

On the right side of the machine, as shown in FIG. 1, is a function control knob 10 having six functional positions: Posting I, Posting II, Transfer, Install, Trial Balance, and Add. This knob may be set to any one of these positions, in order to control the type of operation which it is desired that the accounting machine 50 perform in the next operation, and may be locked in any position by the locking means 104 (FIG. 1).

Amount Banks and Amount Differentials

Since the twelve banks of amount keys 65 and their associated differential mechanisms are all alike, only one of said banks and the differential mechanism associated therewith will be described. This differential mechanism is disclosed in FIG. 5, which is a transverse sectional view of the machine taken just to the right of one of the amount banks, showing the bank and its associated differential mechanism.

The amount keys 65 are mounted in a key bank frame 110, supported by rods 111 and 112, extending between main side frames 109 (only one of which is shown) of the machine. Depression of any one of the amount keys 65 rocks a zero stop pawl (not shown), associated with that particular denomination, counter-clockwise out of the path of a reset spider 114, in the manner well-known in the art. The reset spider 114 is free on a hub of an amount differential actuator 115, rotatably supported on a bushing 116, extending between two similar support plates 117 (only one shown here), said plates being in turn supported by rods 118 and 119, extending between the main side frames 109. There are a pair of supporting plates 117 for each amount differential, and a tie rod 120 extends through holes in the center of the bushings 116, to secure all of the amount differentials in a compact unit.

A notch in the forward end of the spider 114 engages a stud 121, in the forward extension of a bell crank 122, pivoted on an extension of the actuator 115. Carried by the vertical arm of the bell crank 122 is a stud 123 on which is pivoted a link 124. The link 124 is also pivoted to the upper end of a latch 125, pivotally mounted on the actuator 115. The latch 125 has a foot 126, normally held in contact with the periphery of a driving segment 127, just above a shoulder 128 thereon, by means of a spring (not shown). The driving segment 127 is rotatably supported on the hub of the actuator 115. A link 130 pivotally connects the driving segment 127 to a cam lever 131, pivoted on a stud 132, on the left-hand one of the plates 117, said lever 131 carrying rollers 133 and 134, which coact with the peripheries of cams 135 and 136, respectively, secured on a main shaft 108. Depression of any one of the amount keys 65 moves its lower end into the path of a rounded surface 137 of an extension of the forward arm of the bell crank 122.

In adding operations, the main shaft 108 and the cams 135 and 136 make one clockwise rotation, causing the lever 131 to rock the driving segment 127, first clockwise and then counter-clockwise, back to normal position. Clockwise movement of the segment 127 causes the shoulder 128 thereon, in cooperation with the foot 126 of the latch 125, to carry the latter and the amount actuator 115 clockwise in unison, until the rounded surface 137 contacts the steam of the depressed amount key 65. This rocks the bell crank 122 and, through the arm 124, the latch 125, counter-clockwise, to disengage the foot of the latch from the shoulder 128 to arrest clockwise movement of the actuator 115 and to position said actuator according to the value of the depressed amount key 65. This disengagement of the latch 125 moves a rounded extension 143 of the arm 124 into engagement with the corresponding one of a series of locating notches 144 in a plate 145, secured between the rod 118 and the upper extension of the left-hand support plate 117.

After the latch 125 is disengaged from the shoulder 128, an arcuate surface 146, on the segment 127, moves opposite the foot 126 to retain the latch disengaged in its set position.

When the lever 131 reaches the terminus of its clockwise movement, a roller 147, carried thereby, coacts with an arcuate surface 148 on a beam 149, pivoted on a stud 150 in the actuator 115, and forces a concave surface on the upper edge of said beam into contact with the hub of the actuator 115 to move the rear end of said beam into a position commensurate with the value of the depressed amount key.

The rear end of the beam 149 is bifurcated to engage a stud 151 on a link 152, the upper end of which link is pivoted to a segment 153, mounted on one of a set of nested sleeves supported by a shaft 155, journaled between the main side frames 109. The lower end of the link 152 is pivotally connected to a segment arm 156, pivoted on a shaft 157, journaled between the side frames 109. The segment arm 156 carries a stud 158, which engages a camming slot in a zero elimination cam plate 159, pivotally mounted on a stud 160 on a segmental gear 161. The segmental gear 161 is rotatably mounted on a shaft 162, journaled between the side frames 109.

The teeth of the segmental gear 161 mesh with external teeth of an external-internal ring gear 163, having internal teeth, which, in cooperation with the periphery of a disk 164, form a rotatable support for said gear 163. The disk 164 is fixed on a shaft 165, and the latter is supported by brackets 166 secured to a cross bar 107 and the main framework of the machine. The internal teeth of the ring gear 163 mesh with a pinion 168, rotatably supported in a boring in the disk 164. The pinion 168 is mounted on a square shaft 169, and the shaft 169 has mounted thereon pinions like the pinion 168, for each columnar position in which an entry is to be made.

The mode of driving the type wheels of the present column-printing mechanism is fully explained in the United States patent to Charles H. Arnold, No. 2,141,332, and embodies an application of the well-known principle of driving mechanism as disclosed in the United States patent to Walter J. Kreider, No. 1,693,279.

To properly align the differential mechanism and the type wheels set thereby, there is provided on each of the segments 153 a series of notches 171, engaged by an aligner 172, secured to a shaft 173, journaled in the machine side frames.

The aligner 172 is disengaged from the notches 171 during the differential setting of the type wheels, and, after they have been set under control of the amount keys 65, in the manner just described, the aligner 172 is again moved into engagement with the notches 171 to hold the type wheels during the printing operation.

Totalizers

Figure 5:
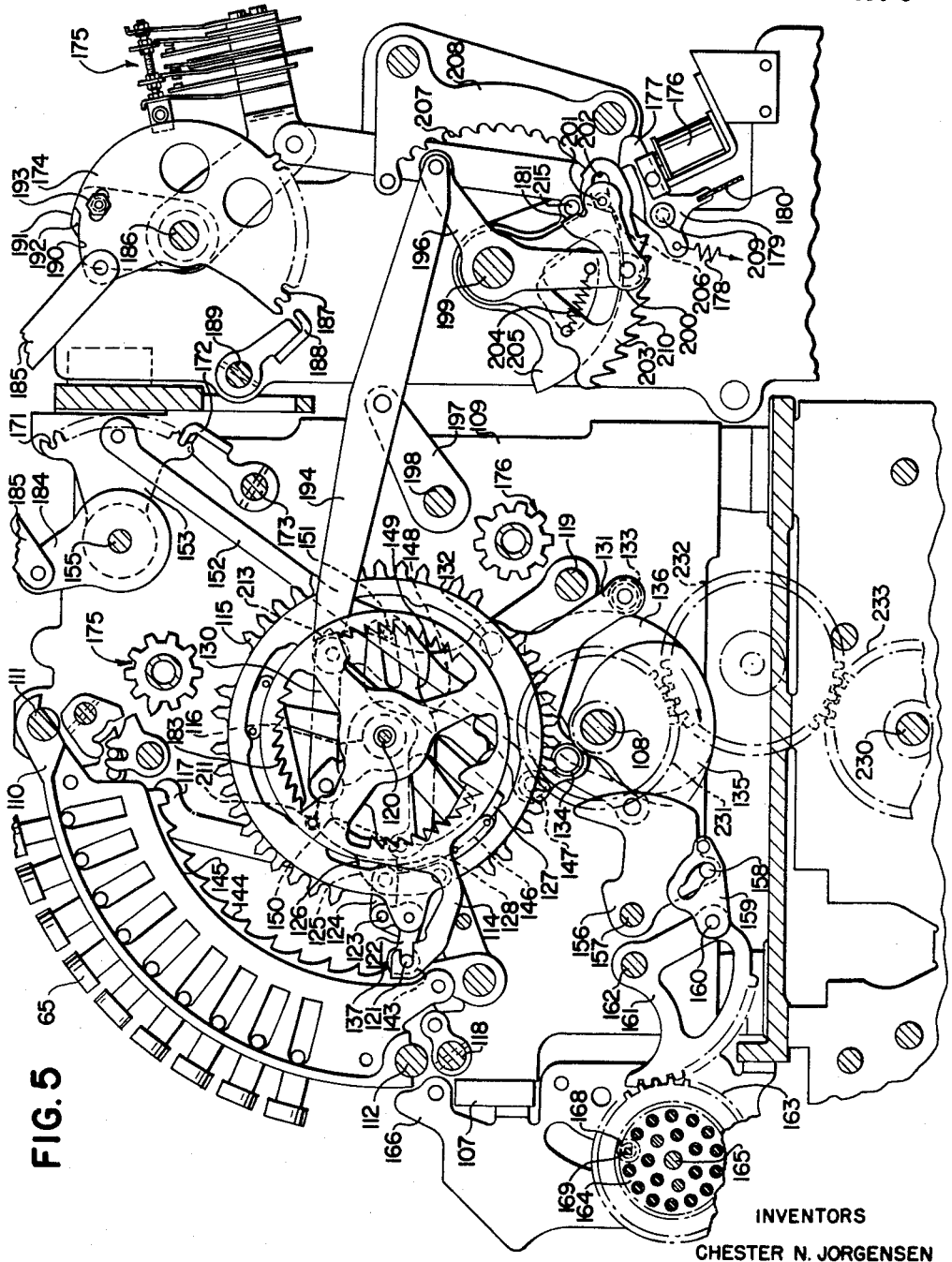
FIG. 5 is a cross-sectional view showing one of the amount denominational order differential mechanisms with its related check-back and recording control plate and auxiliary differential mechanism, by which the setting of the differential mechanism can be effected under control of the ledger card.

The machine embodying this invention has two lines of totalizers, including an upper totalizer line 175 (FIG. 5), and a back totalizer line 176 (FIG. 5). The totalizer line 175 comprises a balance totalizer, often referred to as a "crossfooter," which includes the denominational sets of plus and minus wheels, said plus and minus wheels in each denominational order being reversely geared together, so that, when one wheel is turned one direction, the other turns in the opposite direction, and vice versa, as is well-known in the art and fully described in the United States patent to Bernis M. Shipley, No. 1,619,796. The totalizer line 176 includes a plurality of individual totalizers, as follows: plus balance pickup, minus balance pickup, plus new balance, minus new balance, check total, deposit total, check correction, and deposit correction. It will, of course, be realized that the particular totalizers enumerated above are only illustrative, and that other totalizers may be used with the present invention, if desired or necessary.

The totalizers on the totalizer lines 175 and 176 are selectively engaged with the differential actuators 115 during counter-clockwise movement of the actuators in adding and subtracting operations and during the clockwise movement of the actuators in the second cycle of total and sub-total operations, as fully described in the previously-mentioned Bernis M. Shipley Patent No. 1,619,796. The related differential mechanism is controlled during total-taking operations by the totalizer wheel when the wheel is turned to zero. In this position, a stop is moved into a notch 183 in the reset spider 114, to arrest the spider in a position commensurate to the value of a totalizer wheel which is being reset to zero. The reset spider 114, when thus arrested, is effective, through the notch engaging the stud 121, to disengage the latch 125 from the driving segment in the manner well-known in the art and fully described in said Shipley patent.

Secured to each segment 153 is an arm 184 (FIG. 5), to which is connected a link 185, the other end of which is connected to a check-back and recording control plate 174, free on a shaft 186, for controlling the operation of certain switches 175 in check-back and recording operations. The manner in which said switches function is fully described in the previously-cited United States patent application Serial No. 610,754. The control plate 174 is provided with aligning teeth 187, engaged by an aligner 188, secured to a shaft 189, which is rocked at the proper time to align the control plate 174 in set position after it has been set under control of the differential mechanism.

The control plate 174 is formed with a smaller diameter, as at 190, and a larger diameter, as at 191, which are interconnected by a rise. As the control plate 174 is set to different positions by the differential mechanism, the rise will be set to different positions to provide the required controls for check-back and recording operations. In order that the point of rise between the smaller diameter and the larger diameter can be accurately set, an auxiliary plate 192 having the smaller diameter, the larger diameter, and a similar rise, is mounted adjacent the control plate 174, for limited movement relative thereto, and is secured in adjusted position relative to the plate 174 by a clamping unit 193. Accordingly, each individual control plate can have its rise accurately adjusted in order that its control over the groups of contacts, as 175, can be precisely timed with relation to the movement of the ledger card past the reading and recording heads.

Auxiliary Differential Mechanism

The various differential mechanisms of the accounting machine of the present invention are controlled to be differentially set under control of data recorded magnetically on the channels 53 (FIG. 4) on the back of each ledger card 51. This control is effected by means of the auxiliary differential mechanisms (FIG. 5), one of which is provided for each of the channels on the card. The auxiliary differential mechanisms are differentially settable under control of the data recorded in the channels on the ledger card as the ledger card is being fed into the machine in a balance pickup operation, and function to temporarily store the data until it is entered into the machine. The electrical controls which are operable to control the setting of the auxiliary differential mechanisms are fully disclosed in the previously-mentioned United States patent application Serial No. 610,754.

The auxiliary differential mechanisms are operable to differentially position stopping means which cooperate with the reset spiders 114 of certain of the differential mechanisms, and with a corresponding arm of the differential mechanism for the control row 2, to control the setting of these differential mechanisms.

The stopping means for arresting each reset spider 114

(FIG. 5) comprises a differentially-settable stop member 194, pivoted on a differentially-positionable bell crank 196, and also supported near its center by an arm 197, pivoted on a shaft 198. The bell crank 196 is mounted on a shaft 199, supported in the framework of the machine. Supported on the lower arm of the bell crank 196 is a differential latch 200, having a stud 201, projecting into a cam slot 202, formed in a segment 203, also pivoted on the shaft 199. A spring 204, stretched between a stud on the segment 203 and the bell crank 196, normally maintains the stud 201 in the left-hand end of the cam slot 202.

Secured to the shaft 199 for each differential mechanism is a driving member 205, having a cam edge 206, against which the stud 201 on the latch 200 is normally engaged by the action of the spring 204. The shaft 199 is rocked first counter-clockwise, as seen in FIG. 5, and then clockwise back to its normal position during certain operations of the machine. During the counter-clockwise movement of the shaft 199, the driving member 205, engaging the stud 201, carries the latch 200 and the bell crank 196 therewith, to thrust the stop member 194 leftwardly as viewed in FIG. 5.

During the time that the ledger card is fed into the machine in a balance pickup operation, the data represented by the respective channels on the ledger card controls the operation of solenoid 176 of the auxiliary differential mechanisms corresponding to these channels. The solenoid 176 for each auxiliary differential mechanism, as is fully described in the previously-cited United States patent application, Serial No. 610,754, is normally energized and therefore holds a spring-urged pawl 177 in its downward position. The pawl 177, which is urged counter-clockwise (FIG. 5) by a spring 178, is pivoted on a stud 209, carried by the framework of the machine, and lies in the plane of notches 210 of the segment 203. A downward extension 179 on the hook cooperates with a notched slide 180 to prevent release of the slide unless the pawl is released by deenergization of the solenoid. In a proper pickup operation, the slide 180 is subsequently released by a cam (not shown) to operate a switch (not shown), thus indicating a proper pickup of information from the ledger card, and permitting continuation of operation of the machine in its predetermined sequence.

When, during the operation of the machine, the solenoid 176 is deenergized to release the pawl 177, said pawl, which is biased to move counter-clockwise as viewed in FIG. 5, is released to engage the particular notch 210, corresponding to a predetermined numerical value, which is in the path of the pawl 177 at the moment that the solenoid 176 is deenergized.

The operation of the segment 203 is synchronized with the movement of the ledger card into the accounting machine, so that, when a control point representing a digit of a certain value reaches the reading and recording head, the solenoid is deenergized as a result of a signal from the card at the moment the notch 210 of the commensurate value is in the path of the pawl 177. When the pawl 177 engages the notch 210, the segment 203 is stopped. However, the bell crank 196 is driven a short distance thereafter by the driving member 205, and during this movement the stud 201, riding in the cam slot 202, causes the latch 200 to be rocked clockwise on the bell crank 196, to disengage the stud 201 from the cam edge 206, thus permitting the driving member 205 to move its full excursion after the segment 203 has been arrested by the pawl 177. The clockwise rocking of the latch 200 causes the stud 201 to engage in one of the locking notches 207 in a locking plate 208.

Disengagement of the latch stud 201 from the driving member 205 causes the bell crank 196 and the stop arm 194 to be arrested in the position commensurate with the value of the digit picked up from the ledger card, and positions an end 213 of the stop arm 194 in the path of a stud 211 on the reset spider 114. Therefor, when the stud 211 is moved upon the rocking of the reset spider 114, said stud, engaging the end 213 of the stop arm 194, arrests the spider 114 in a position commensurate with the value picked up from the card. The arresting of the reset spider 114, through the stud 121, disengages the latch 125 from the driving segment 127 of the amount differential, thus setting the amount differential into a position commensurate with the value read from the card.

The amount differential thereby sets the printing mechanism in the manner well-known in the art, through the beam 149, the link 152, and the segment arm 156.

A stop arm similar to the stop arm 194 is provided in connection with the auxiliary differential mechanism for the control row. This is operable to control the control differential to set said differential according to the information picked up from the appropriate column on the ledger card 51.

The bell crank 196 and the stop arm 194 are restored to their normal positions, after the proper entries have been made, by a stud 215 on the driving member 205. During the return stroke of the driving member 205, the stud 215 engages the surface 181 on the latch 200, thus carrying the latch and the bell crank 196 back to home positions. Near the beginning of the return stroke, the stud 201 is moved into its left-hand, or normal, position within the slot 202, which removes the stud 201 from the notch 207 and into the path of the cam edge 206.

For a further description of the construction and operation of the auxiliary differential mechanism, reference may be had to the previously-cited United States patent application Serial No. 610,754.

Dual Account Number and Reference Number Printing and Check-Back Control

As has been previously stated, the four rows of keys 64 on the keyboard 62 are used for indexing of a reference number into the accounting machine 50 in connection with each check or deposit item. During item posting operations, depression of a key 64 (FIG. 6) controls the differential mechanism for that bank, shown generally at 220, to set a ring gear 221, through a link 222, and a segment arm 223, according to the key indexed, to effect printing of that reference number on the ledger card 51 and the journal sheet 94 during cycling of the accounting machine. The operation of the differential mechanism will not be described in detail, since it is the same as the operation of the differential mechanism for the amount banks, shown in FIG. 5, and previously described.

Figure 6:
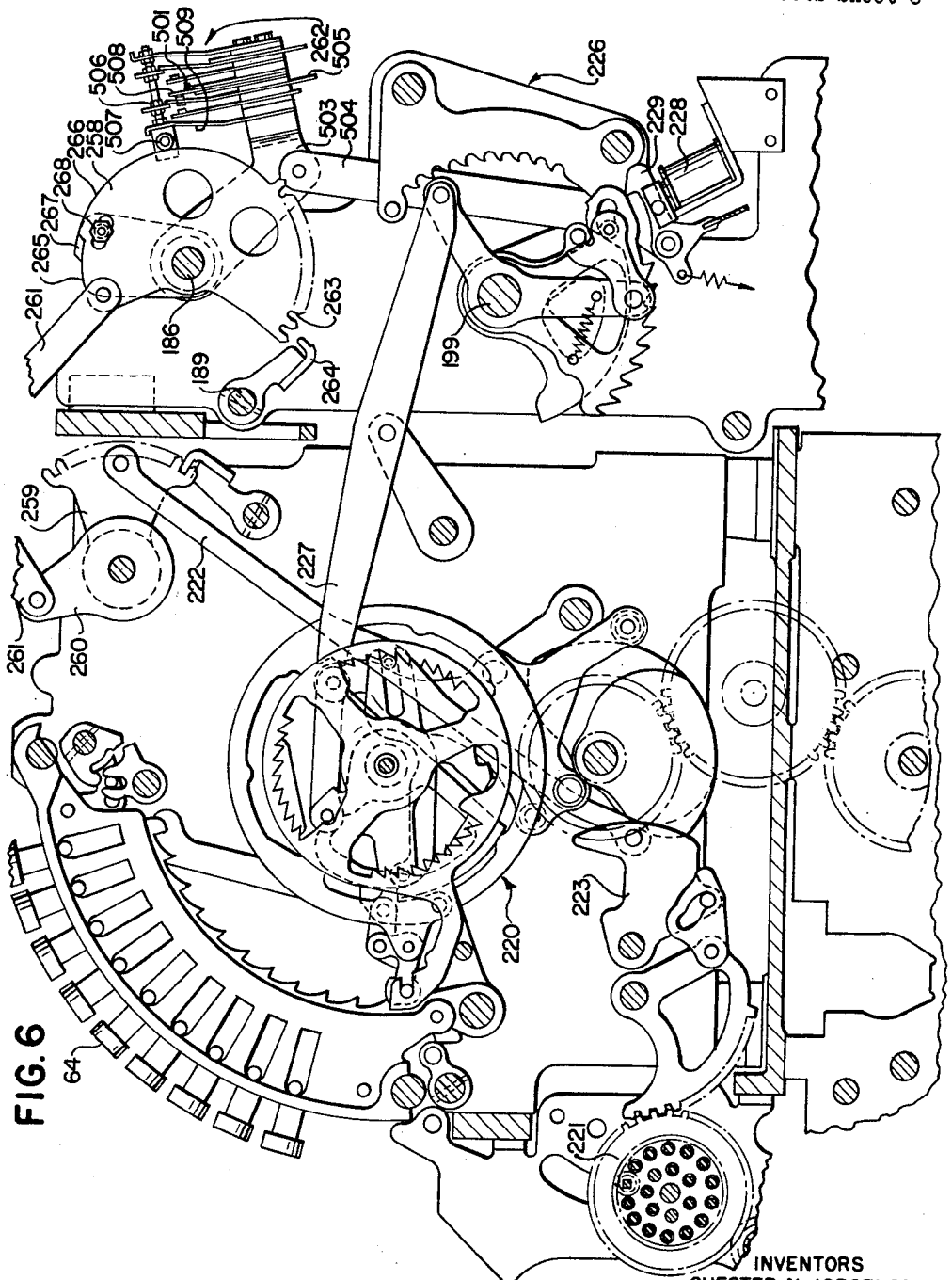
FIG. 6 is a cross-sectional view showing one of the differential mechanisms and associated mechanism used for entering account number and reference number data into the machine.

During balance pickup operations, the differential mechanism 220 for each of the three right-most reference number banks is controlled by the auxiliary differential mechanism, shown generally at 226 in FIG. 6, through the stop arm 227, rather than by means of the keys 64, which are not depressed in balance pickup operations. The various orders of the account number, magnetically encoded in certain of the magnetic strips 53 of the ledger card 51 are sensed by the reading heads of the accounting machine 50. The resulting signal, in each instance, causes deenergization of one of the solenoids 228 to release an associated pawl 229, and thus set the corresponding auxiliary differential mechanism 226 according to the number encoded, in the manner previously described in connection with the amount differential and auxiliary differential mechanisms shown in FIG. 5. The auxiliary differential mechanism then controls the differential mechanism 220 through the arm 227 to position the ring gear 221 for control of printing.

It is thus seen that the printing mechanism controlled by the differential mechanisms corresponding to the banks of keys 64 (FIG. 2) is set according to information indexed into the keyboard 62 on the keys 64 during an item posting operation, and is set according to account number information magnetically encoded on a ledger card 51 during a balance pickup operation. Controls which will be subsequently described are provided to cause the reference number information to be printed on both the ledger card 51 and the journal sheet 94, while the account number information is caused to be printed only on the journal sheet.

A check-back and recording control plate 258, free on the shaft 186, is also set by the differential mechanism 220 acting through the link 222, a segment 259 to which said link is connected, an arm 260 secured to said segment, and a link 261 connecting the arm 260 to the plate 258. The plate 258 functions to control the operation of certain switches shown generally at 262 in check-back and recording operations. The functioning of these switches will be subsequently explained in the description of the operating circuitry of the machine. The control plate 258 is provided with aligning teeth 263, engaged by an aligner 264, secured to the shaft 189, which is rocked at the proper time to align the control plate 258 in set position after it has been set under control of the differential mechanism 220.

The control plate 258 is formed with a smaller diameter, as at 265, and a larger diameter, as at 266, which are interconnected by a rise. As the control plate 258 is set to different positions by the differential mechanism, the rise will be set to different positions to provide the required controls for check-back and recording operations. In order that the point of rise between the smaller diameter and the larger diameter can be accurately set, an auxiliary plate 267 having the smaller diameter, the larger diameter, and a similar rise, is mounted adjacent the control plate 258, for limited movement relative thereto, and is secured in adjusted position relative to the plate 258 by a clamping unit 268. Accordingly, each individual control plate can have its rise accurately adjusted in order that its control over the groups of contacts, as 262, can be precisely timed with relation to the movement of the ledger card 51 past the reading and recording heads 55.

*Printer*

The printing mechanism is operated by cams on the printer cam shaft 230 (FIG. 5), which is driven from the main cam shaft 108 of the machine. The drive for the cam shaft 230 extends through gears 231, 232 and 233, and through a clutch (not shown), in a manner which is fully described in the United States patent to Everett H. Placke, No. 2,351,541, which was issued on April 10, 1945.

In the machine to which the present invention is shown applied, type wheels 234 (FIG. 9) are mounted on a shaft 235 in groups, one group being provided for each column in which a record is to be recorded on the ledger card 51 or numerals card 58. An individual hammer 236 is provided for taking impressions in each column.

The printing wheels in each group are positioned from the various differential mechanisms through internal gear drives, such as that shown and described in the United States patent to Walter J. Kreider, No. 1,693,279. The selection and operation of a particular hammer are under control of notched control plates, hereinafter referred to as a control unit, which includes a group of square shafts, each having thereon a pinion driven by internal teeth of an internal-external gear. These gears and the driving mechanism therefor form an internal gear drive substantially like that shown in the above-mentioned Kreider patent.

These internal-external gears are distributed at various points along the group of shafts, and also carried by the various square shafts are pinions which mesh with the internal gear teeth of selecting and control disks to select the various printing hammers and to control the operation of theese various units, such as the card carriage feeding mechanism, which carriage supports the ledger card and numerals card at different times; the hammers for recording on the ledger card and numerals card; the feed control for the journal sheet, and various other mechanisms within the printing mechanism. For a more complete description of these mechanisms and controls, reference may be had to the patent to Spurlino et al., No. 2,373,510.

Each printing hammer is provided with a platen 238, and has connected thereto a link 239, which in turn is connected to an arm 240, forming a toggle connection. The arm 240 is pivoted on a shaft 241. Also connected to the arm 240 is an arm 242, carrying a stud 243. Associated with each stud 243 is a link 244, pivoted to an arm 247, secured to a shaft 246. The arm 247 is provided with a pair of rollers 248, coacting with a pair of cam plates 249 on the printer cam shaft 230.

The hammer 236 which is to be operated is selected under control of means comprising notched plates set under control of the transaction banks, as fully described in the above-mentioned Spurlino et al. patent. Coacting with the respective notched plate is a feeler arm 250, on which is supported a two-fingered pawl 251. The arms 250 are pivoted on a shaft 252, and each arm 250 is provided with a finger 253, held in engagement with a stud 254, on an arm 255, secured to the shaft 252. The free end of the feeler arm 250 is provided with a link 256, pivoted to the previously-mentioned link 244. The forward end of the link 244 is provided with a notch 257, which may be lowered into engagement with its associated stud 243.

During the operation of the machine, when the printer cam shaft 230 is operated, the arm 255 is rocked to move the feeler arm 250 and the feeler pawls 251 toward their associated notched plate or plates. If the feeler arm 250 and the feeler pawls 251 are permitted to drop into notches, the arm 250 is rocked counter-clockwise, as viewed in FIG. 9, thus lowering the link 256 and engaging the notch 257 of the link 244 over the stud 243 of its associated printing hammer mechanism. Thereafter, during the machine operation, the cams 249 rock the cam follower arm 247 and the shaft 246 clockwise. This moves the link 244 to the right, as viewed in FIG. 9, and, through the stud 243, rocks the arm 242 counter-clockwise. Rocking of the arm 242 straightens the toggle, consisting of the arm 240 and the link 239, thus raising the hammer 236 to make an impression on the ledger card or numerals card.

The feeler-operating shaft 252 is rocked by a pair of cams (not shown) secured to the printer cam shaft 230. When the printer cam shaft 230 is actuated during an operation in which a print is to be obtained, these cams rotate to shift a linkage (not shown) in such a manner that a counter-clockwise movement is imparted to the shaft 252. Counter-clockwise movement of the shaft 252 rocks all of the arms 255 counter-clockwise, thus moving the feeler arms 250 and the feeler pawls 251 into engagement with their control plates to determine which of the printing hammers is to be operated during the ensuing operation of the machine.

*Account Number Printing on Journal Strip*

Figure 9:
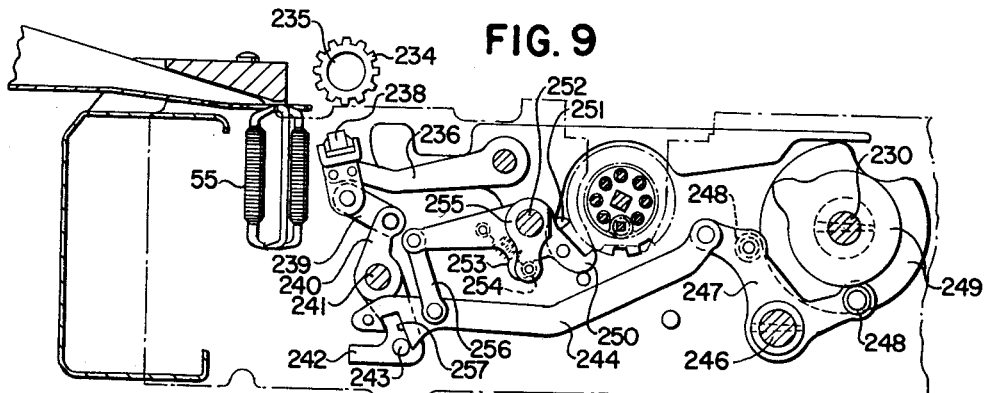
FIG. 9 is a detail view showing the pickup heads of the accounting machine and the print control means for controlling printing on the ledger cards.

A printing mechanism shown in part in FIG. 7 is provided for printing information on the journal sheet 94, and is similar in many respects to the ledger card printing mechanism shown in FIG. 9.

Type wheels 270 for printing on the journal sheet are mounted on a shaft 271 in groups, with one group being provided for each column of the journal sheet to be printed. The printing wheels in each group are positioned from the various differential mechanisms through internal gear drives, as described in connection with the mechanism shown in FIG. 9.

An individual hammer 272 is provided for each group of wheels 270, and is controlled by notched control plates in the same manner as described in connection with FIG. 9. Each printing hammer is provided with a platen 273, and has connected thereto a link 274, which in turn is connected to an arm 275, forming a toggle connection. The arm 275 is pivoted on a shaft 276. Also connected to the arm 275 is an arm 277, carrying a stud 278. Associated with each stud 278 is a link 279. The link 279 is cam-operated in regular movement in the same manner as the link 244 of FIG. 9.

The hammer 272 which is to be operated is selected under control of means comprising notched plates set under control of the transaction banks, in the same manner as described in connection with the mechanism of FIG. 9. Coacting with the respective notched plate is a feeler arm 280, on which is supported a two-fingered pawl 281. The arms 280 are pivoted on a shaft 282, and each arm 280 is provided with a finger 283, held in engagement with a stud 284, on an arm 285, secured to the shaft 282. The free end of the feeler arm 280 is provided with a link 286, pivoted to the previously-mentioned link 279. The forward end of the link 279 is provided with a notch 287, which may be lowered into engagement with its associated stud 278.

During the operation of the machine, when the printer cam shaft 230 is operated, the arm 285 is rocked to move the feeler arm 280 and the feeler pawls 281 toward their associated notched plate or plates. If the feeler arm 280 and the feeler pawls 281 are permitted to drop into notches, the arm 280 is rocked counter-clockwise, as shown in FIG. 7, thus lowering the link 286 and engaging the notch 287 of the link 279 over the stud 278 of its associated printing hammer mechanism. Thereafter, during machine operation, the link 279 is moved to the right, as viewed in FIG. 7, and, through the stud 278, rocks the arm 277 counter-clockwise, which straightens the toggle consisting of the arm 275 and the link 274, thus raising the hammer 272 to make an impression on the journal sheet.

If, on the other hand, the feeler arm 280 and the feeler pawls 281 are opposite a high surface on the notched control plate, the arm 280 is prevented from rocking in a counter-clockwise direction, and the notch 287 in the link 279 is not lowered into engagement with the stud 278 on the arm 277. Therefore, the subsequent movement to the right of the link 279 will be merely an idle movement, and the toggle composed of the arm 277 and the link 274 will not be straightened to raise the hammer 272.

An additional means for controlling a journal printing operation is provided and, as shown in FIG. 7, includes a solenoid L6 secured to the machine framework. The operating member of the solenoid is pivotally connected to one end of a link 292, which is pivotally connected at its other end to a projection 293 formed on a circular member 294 rotatably mounted on the internal gear control unit for the journal sheet printing mechanism.

The member 294 is provided with a central circular cut-out portion having internal gear teeth which cooperate with teeth on a pinion 295 in the internal gear control unit. The pinion 295 is fixed on a square shaft 296 and controls the movement of a plate 297 having a notch 298.

A spring 299, secured at one end to a stud 300 in the machine framework, and at the other end to a stud 301 fixed on the link 292, is effective to urge the link 292 normally to the right, as shown in FIG. 7, so that a surface 302 on said link engages the stud 300 in the machine framework.

The stud 301 on the link 292 also engages a notch 305 on a lever 306 free on a shaft 307 supported in the machine framework. At its upper end, the lever 306 is provided with a stud 308 adapted to engage an actuator 309 of a switch 310 mounted in the machine framework and comprising the contacts SC27A1 and SC28A1.

When the solenoid L6 is energized by means which will subsequently be described in the explanation of the electrical circuitry of this invention, the link 292 is shifted to the left as viewed in FIG. 7, against the force of the spring 299. This rocks the projection 293 and its associated member 294 in a clockwise direction. This movement is effectively transmitted through the pinion 295 and the shaft 296 to the plate 297, and rotates said plate to position the notch 298 out of the path of the feeler pawl 281. A high surface is accordingly presented to the pawl 281, and this is effective to prevent printing, in the manner previously described.

In addition, shifting of the link 292 and the stud 301 thereon acts through the lever 306, the stud 308, and the actuator 309, to operate the contacts SC27A1 and SC28A1 of the switch 310. The manner in which these contacts function in the overall operation of the machine will be subsequently described in the explanation of the electrical circuitry.

*Date Setting Means*

Figure 10:
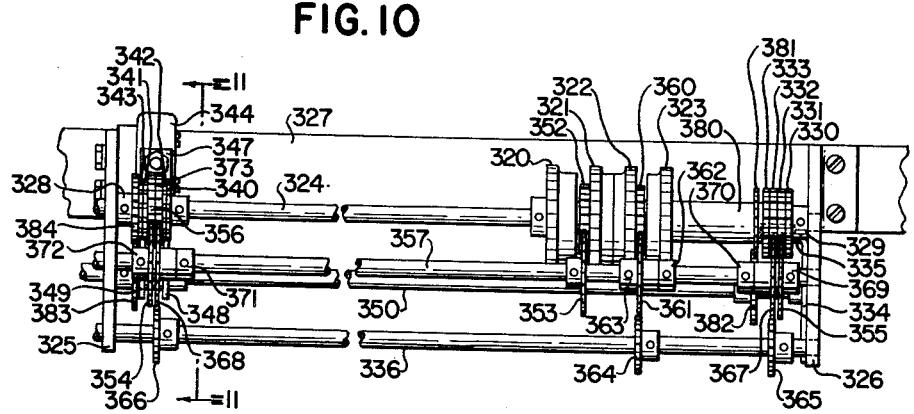
FIG. 10 is a detail view showing the controls for setting date information to be printed by the accounting machine, and also showing the switch means which insure proper positioning of the date control knobs.
Figure 11:
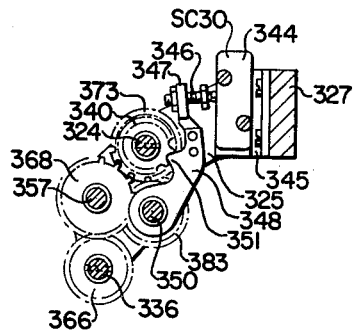
FIG. 11 is a cross-sectional view taken on line 11—11 of FIG. 10.

The mechanism for controlling the setting of the date to be printed upon the ledger cards and the numerals transfer cards is shown in FIGS. 10 and 11. It will be recalled that the four date-setting knobs are shown generally at 70 in FIG. 1. These are shown more specifically in FIG. 10, including a month-setting knob 320, two day-setting knobs 321 and 322, and a year-setting knob 323.

All of these knobs are mounted on a shaft 324 journaled in two side frames 325 and 326 secured to a bar 327 in the machine framework. The shaft 324 is held against axial movement relative to the frames 325 and 326 by means of two collars 328 and 329, secured to the shaft just inside the plates 325 and 326.

A group of gears 330 to 333 inclusive are controlled by the date-setting knobs 320 to 323 inclusive, and in turn control the setting of type wheels (not shown) by means of which the date may be printed on the various record members.

Also, the gears 330 to 333 inclusive cooperate with a locking lever 334 for enabling the date-setting mechanism to be locked against movement from a selected position. The lever 334 is provided with a bent-over end portion 335 for engagement between adjacent teeth in each of the gears 330 to 333 inclusive, and is pivotally mounted on a shaft 350 journaled in the side frames 325 and 326. Conventional locking means 103 (FIG. 1) located on the outside of the housing of the machine 50 are provided to control the movement of the lever 334, so that the end portion 335 may be moved selectively in and out of engagement with the teeth of the gears 330 to 333 inclusive to control whether or not these gears, and the knobs 320 to 323, with which they are operatively associated, may be moved.

A group of gears 340 to 343 inclusive are also controlled by the date-setting knobs 320 to 323 inclusive, and in turn control an interlock switch 344 containing the contacts SC30B1 to prevent operation of the machine when the date knobs have not been properly set. The switch 344 is mounted by a bracket 345 on the bar 327, and is operated by an actuator 346 secured to a bail 347 having legs 348 and 349 rotatably mounted on a shaft 350 journaled in the side frames 325 and 326. Each of the legs 348 and 349 has formed thereon a projection 351 shaped to fit between adjacent teeth of the gears 340 to 343 inclusive, and each leg is located with respect to the gears so that the projection 351 on the leg 348 coacts with the gears 340 and 342, and so that the projection 351 on the leg 349 coacts with the gears 341 and 343.

It will be seen that in the event that any one of the gears 340 to 343 inclusive is not properly positioned, the corresponding projection 351 will not be able to enter the space between adjacent teeth, and the bail 347 will be held to the right of the position in which it is shown in FIG. 11, causing the contacts SC30B1 of the switch 344 to be operated. Operation of these contacts, as will subsequently be described in the explanation of the electrical circuitry, prevents operation of the accounting machine until the setting of any improperly positioned date knob is corrected.

The manner in which the various gears are set by movement of the knobs 320 to 323 inclusive will now be described.

The knob 320; the gear 330, which is formed integral with the collar 329; and the gear 340 are all secured to the shaft 324, so that they move as a unit, when the knob 320 is rotated to a desired position by the machine operator.

The knob 321 and a gear 352 formed integrally therewith are free on the shaft 324. The gear 352 meshes with a pinion 353 secured to a shaft 357. Two additional pinions 354 and 355 are also secured to the shaft 357, and are located to mesh respectively with the gear 331, and with a gear 356 formed integrally with the gear 341. Movement is thus transferred from the knob 321 to the gears 331 and 341 by the gear train described above.

The knob 322, which has formed integrally therewith a gear 360, rides free on the shaft 324. The gear 360 meshes with an idler gear 361 which rides free on the shaft 357, and is retained in position thereon by collars 362 and 363. The idler gear 361 in turn meshes with a pinion 364 secured to the shaft 336. Two additional pinions 365 and 366, secured to the shaft 336, act through idlers 367 and 368, which are free on the shaft 357 and which are retained in position thereon by collars 369, 370 and 371, 372, respectively, to operate the gear 332 and a gear 373 formed integrally with the gear 342. Movement is thus transferred from the knob 322 to the gears 332 and 342 by the gear train described above.

The knob 323 is connected by a sleeve 380 to the gear 333, and to an additional gear 381 which meshes with a pinion 382 secured to the shaft 350. Also secured to the shaft 350 is a pinion 383 which meshes with a gear 384 formed integrally with the gear 343. It is thus seen that movement is transmitted from the knob 323 directly to the gear 333, and through the gears and pinions 381, 382, 383 and 384, to the gear 343.

Numerals Transfer Control

The machine of the present invention is conditioned for a numerals transfer operation in which amount and date information is imprinted on the numerals card 58 by turning the function control knob 100 to "transfer" position and turning the numerals transfer switch 76 (FIGS. 3 and 12) to "on" position. As shown in FIG. 12, the switch 76 is pivotally mounted on a machine frame 390, and is pivotally connected at its lower end to a link 391. Said link is pivotally connected at its other end to an arm 392 of a member 393 having a circular opening provided with internal gear teeth meshing with the teeth of a pinion 394 fixed to a square shaft 395 forming part of the internal gear drive unit for controlling printing on the ledger card and numerals transfer card, in a well-known manner.

An aligner pawl 396 is pivotally mounted on the frame 390 and is urged in a counter-clockwise direction by a spring 397 into engagement with one of the notches in an aligner plate 398 forming part of the internal gear drive unit. The pawl 396 serves to maintain the drive unit in the position to which it has been set, but is cammed out of the notch by cooperating surfaces of the notch and the pawl whenever the position of the plate 398 is changed by the switch 76 or other means.

The lower end of the arm 392 is arranged to coact with an actuator 399 of a switch 400 mounted by means of a bracket 401 on the frame 390. The switch contains contacts SC29A1, SC29B1, SC29A2 and SC29B2. The manner in which these contacts function in the operation of the machine will be subsequently described in the explanation of the electrical circuitry.

Figure 4:
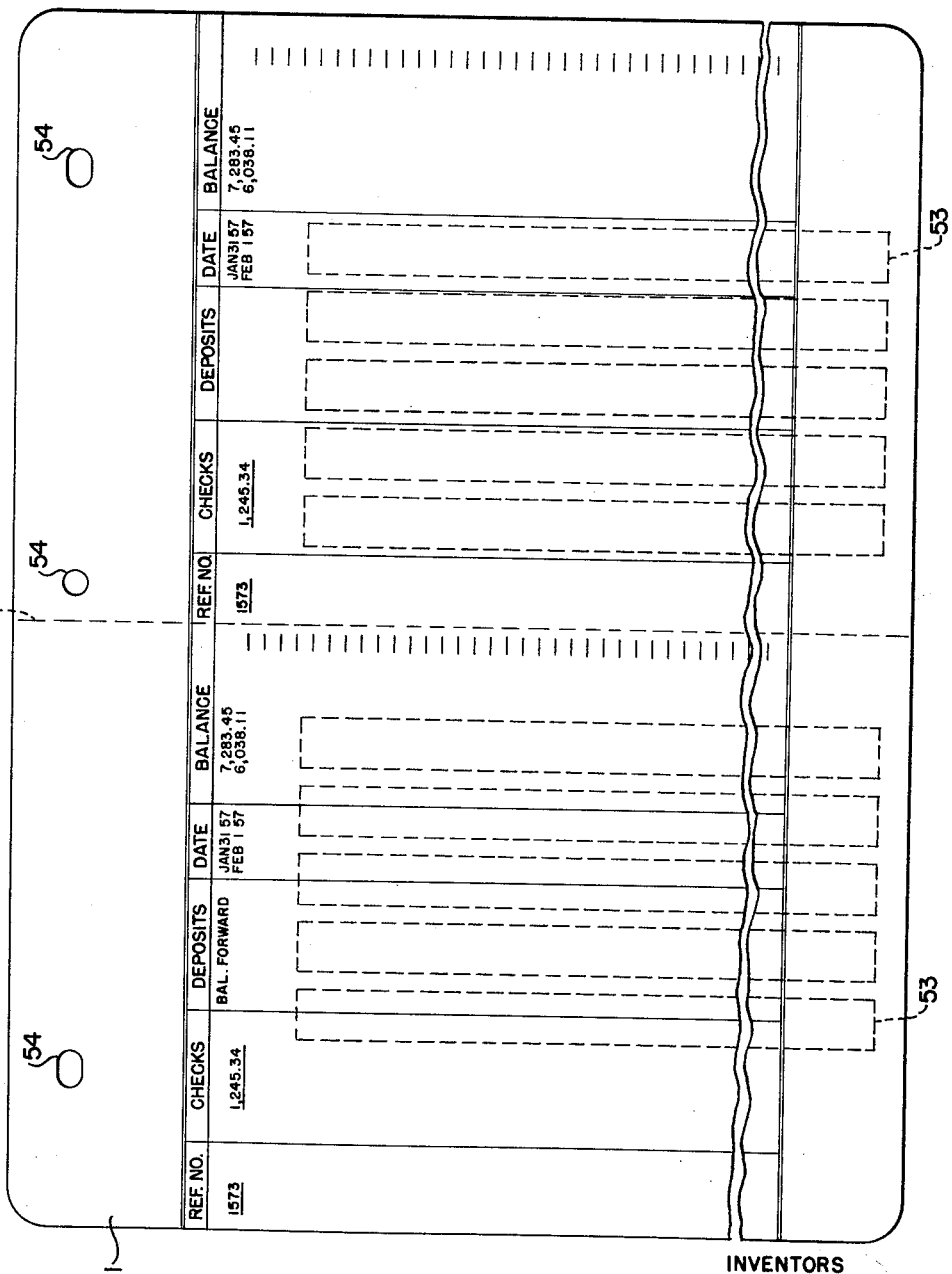
FIG. 4 is a view of a ledger card supplied with magnetizable areas for controlling the machine.

When the switch 76 is shifted from the "off" position, in which it is shown in FIG. 12, to an "on" position, the link 391 is moved to the right, which rocks the arm 392 and the member 393 in a clockwise direction. The lower end of the arm 392 engages the actuator 399 of the switch 400 to operate the contacts SC29A1, SC29A2, SC29B1 and SC29B2. At the same time, the internal gear teeth on the member 393 rotate the pinion 394 and the shaft 395 a predetermined amount. This is effective, in a manner well-known in the art, to shift notched plates in the internal gear drive unit to disable certain of the printing hammers, so that none of the printing hammers which effect printing on the left side of the ledger card 51, as viewed in FIG. 4, are operated in the next printing operation. This control is necessary because, in the second cycle of a numerals transfer operation, a numerals transfer card 58 (FIG. 8) is positioned on the carriage table of the accounting machine for printing, and this card occupies only the right half of the area occupied by the ledger card 51 in the first cycle of a numerals transfer operation. The manner in which a numerals transfer operation is carried out will be subsequently described.

Manual Line Selection Control

The manual line selection control is utilized to select the line upon which printing is accomplished on a numerals card 58 in a numerals transfer operation. It should be noted that the line on which information for an account is printed on the numerals card for that account does not necessarily agree with the line on which the corresponding balance appears on the ledger card for that account. Manual line selection is controlled by the line finding knob 75 and associated switching means (FIGS. 12, 13 and 14). The knob 75 includes a plurality of circular elements 410, 411 and 412, secured together for unitary movement. Said knob is rotatably mounted by means of a shaft 413 on a bracket 414, which in turn is secured to the side frame 390.

The element 410 has marked on its periphery the various line numbers from 1 to 40, also including a "balance forward" line marking, which lines are available on a ledger card adapted for use with the machine of the present invention. The second element 411 is knurled to facilitate manual movement of the knob by a machine operator. Scalloped surfaces 415 on the third element 412 of the knob 75 cooperate with a stud 416 on an arm 417 pivotally mounted on the bracket 414 and urged in a counter-clockwise direction by a spring 418 to retain the knob in a selected position against accidental movement.

Secured to the knob 75 for unitary movement therewith by means of a spacer 419 is a wiper 420, formed from electrically conductive material, and having a generally star-shaped configuration, with one arm or point 421 of the star being somewhat longer than the other arms 422. Indented portions 423 on all of the arms form contact surfaces for engagement with areas such as 424 of conducting material on a printed circuit board 425. The board 425 is located between the wiper 420 and the bracket 414, to which it is secured by rivets 426 or other suitable means, and is provided with a central circular opening 427 through which the shaft 413 of the knob 75 extends.

It will be seen that manual rotation of the knob 75 enables the positioning of the desired line number opposite a locating mark on the lower control panel 74 of the machine. This movement of the knob 75 positions the wiper 420 with respect to the conducting areas 424 on the circuit board 425 so that circuits may be completed to enable the machine to feed a ledger card 51 or a numerals card 58 to the corresponding line space position in the machine for printing on said card. The operation of this circuit will be subsequently described in the explanation of the electrical circuitry.

Line Finding Switch Assemblies

Associated with the line finding circuitry for the accounting machine of the present invention are two line-finding switch assemblies 430 and 431 (FIGS. 15 and 16). The switch assemblies are mounted on a supporting plate 432, fixed on cross bars 101 and 102. Each switch assembly includes a total of twenty contacts imbedded in an insulating plate 433, which is secured to the plate 432. Of these twenty contacts, ten, designated 434, are "live" contacts which extend through the plate 433 and are provided with terminals 435. The other ten contacts, designated 436, are "dead" contacts, and are not provided with any terminal connections on the other side of the plate 433. The "dead" contacts 436 provide a continuity of wiping surface and, at the same time, prevent a wiper from engaging two adjacent "live" contacts 434 at the same time. A common 437, having a terminal 438, is also embedded in the plate 433.

A bearing member 440 is secured to the shaft 199 and has fixed thereto a wiper 441 provided with contacts 442 and 443 for engaging the contacts 434 and 436 and the common 437, respectively. It will be seen that, as the shaft 199 rotates during machine operation, the wiper 441 is carried with it to engage the common 437 constantly, and the contacts 434 and 436 alternately in sequence. As best shown in FIG. 16, the supporting plate 432 is utilized as a common mounting means for the two switch assemblies 430 and 431. The manner in which these switch assemblies function in the line-finding circuitry will subsequently be made clear in the description of the electrical circuitry of the machine of the present invention.

*Operating Circuitry*

A plurality of operating circuits are provided to interrelate the operation of the mechanical components previously described in this specification and to enable them to cooperate in a manner to perform the desired accounting operations which are comprehended by the objects of the present invention. Many of the circuits employed in the accounting machine embodying the present invention are identical or similar to the circuits disclosed in the previously-cited application Serial No. 610,754, and a description of such circuits will not be repeated herein. The present description will be limited to circuits not contained in the machine described in the above-cited application, or to circuits which have been substantially modified from the form in which they appear in said application, in order to perform the particular functions accomplished by the present invention.

*Card Reading Circuit*

The card reading circuits for enabling reading of certain ones of the twenty channels on the ledger card 51 remain the same in the present invention as shown in the previously-cited patent application Serial No. 610,754. However, the card reading circuits for the channels on the ledger card used to store account or comparator number information have been modified so that each is operable to provide a dual function of simultaneously setting two different auxiliary differential mechanisms, one of which is the conventional comparator number auxiliary differential mechanism disclosed in application Serial No. 610,754, and the other of which is the auxiliary differential mechanism disclosed in FIG. 6 for controlling printing of the comparator numbers.

Figure 20:
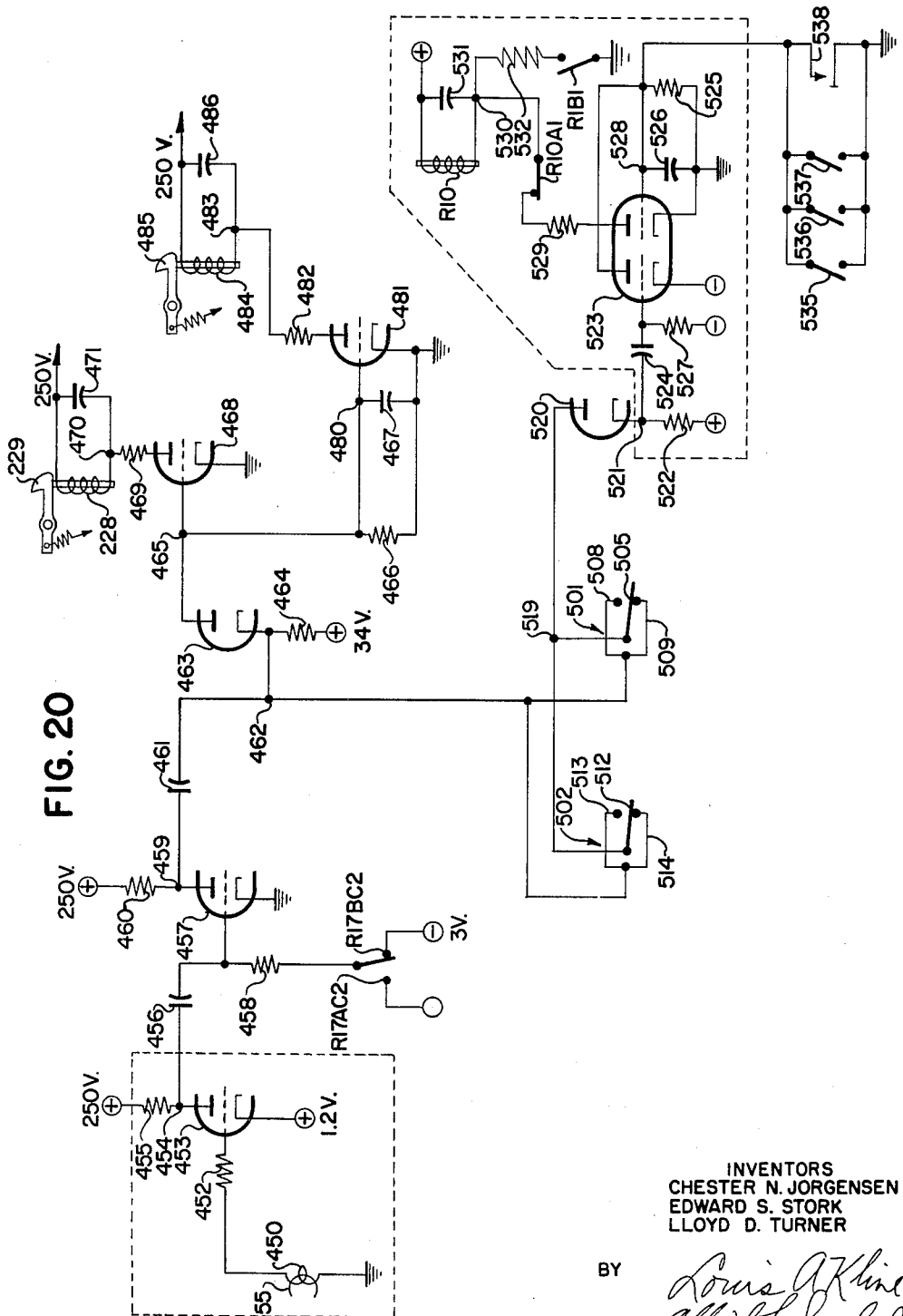
FIG. 20 is a circuit diagram showing the basic electrical circuits involved in reading and recording of account numbers carried on the magnetic ledger card.

The reading circuit shown in FIG. 20 for each comparator channel has two modes of operation, one when reading a card during any in-sweep of the carriage of the accounting machine to control the setting of its associated auxiliary differential mechanisms, and the other when reading the card during the return movement of the card to starting position, to control the check-back circuit. The operation of the circuit as it reads data on the in-sweep of the card will be considered first.

The polarity of the magnetization of the channel and the winding of the coil 450 of the reading head 55 are such that a negative pulse of about 0.07 volt is generated in the coil 450 by the data-representing point when passing from one polarity to the other on the magnetically encoded channel during the in-sweep of the card 51 past the heads.

The reading head 55 has one side of its coil 450 connected to the ground and has the other side of its coil connected over a 100,000-ohm resistor 452 to the control electrode of the pre-amplifier or first amplifier tube 453, which is half of a 5751 type of tube. The tube has its cathode connected to a source of +1.2 volts and has its anode connected over a point 454 and a 470,000-ohm resistor 455 to a +250-volt anode potential supply. This tube is normally conducting to such an extent that it can be controlled by both negative and positive signals from the head 55 to amplify these signals.

Point 454 in the anode circuit of the tube 453 is coupled over a 0.03-microfarad capacitor 456 to the control electrode of the second amplifier tube 457, which is half of a 6SL7 type of tube. The control electrode of the tube 457 is supplied with a −3-volt bias by being connected over a 1-megohm resistor 458 and contacts R17BC2, which are closed during the in-sweep of the card, to a −3-volt bias potential supply. The cathode of tube 457 is grounded, and the anode of said tube is connected over a point 459 and a 270,000-ohm resistor 460 to a +250-volt anode potential supply. With this bias the tube 457 is cut off.

Point 459 in the anode circuit of the tube 457 is coupled over a 0.03-microfarad capacitor 461 and a point 462 to the cathode of a dode 463, which is half of a 6H6 type of tube. The cathode of diode 463 is also connected over a 1-megohm resistor 464 to a +34-volt source of potential. The anode of the diode 463 is connected to ground over a point 465, and a parallel combination of a 4.7-megohm resistor 466 and a 0.005-microfarad capacitor 467. With these potentials applied to the anode and cathode of the diode, the diode will normally be non-conducting.

Point 465 in the anode circuit of the diode 463 is connected to the control electrode of a tube 468, which is half of a 6SN7 type of tube. With diode 463 non-conducting, ground potential is supplied to the control electrode of the tube 468 from point 465. The tube 468 has its cathode grounded and has its anode connected over a 4700-ohm resistor 469, a point 470, and a solenoid 228 to a +250-volt anode supply. A 0.002-microfarad capacitor 471 is connected across the solenoid 228 to prevent a high-voltage surge when the solenoid is deenergized.

The tube 468 is normally conducting, and will maintain the solenoid 228 energized to hold the pawl 229 out of engagement with the teeth in the corresponding segment of the auxiliary differential mechanism so long as the tube conducts.

At a point 480, corresponding to the point 465, the anode circuit of the diode 463 is connected to the control electrode of a tube 481, which is also half of a 6SN7 type of tube. From the point 480, ground potential is supplied to the control electrode of the tube 481 as long as diode 463 is non-conducting. Tube 481 has its cathode grounded, and has its anode connected over a 4700-ohm resistor 482, a point 483, and a solenoid 484 to a +250-volt anode supply. The 0.002-microfarad capacitor 486 is connected across the solenoid 484 to prevent a high-voltage surge when the solenoid is deenergized.

The tube 481 is normally conducting, and will maintain the solenoid 484 energized to hold the pawl 485 out of engagement with the teeth in the corresponding segment of the auxiliary differential mechanism as long as the tube conducts.

The operation of the circuit is as follows:

As the card is being fed past the head 55 during the insweep of the card, a negative pulse of about 0.07 volt is generated in the head when the polarity of the magnetization in the channel changes. This pulse is amplified and inverted by tube 453 to produce a positive pulse of approximately 3.5 volts at point 454 in its anode circuit. The +3.5 volt pulse at point 454 is applied over the capacitor 456 to the control electrode of the tube 457, causing the tube 457 to conduct heavily and to produce a −140-volt pulse at point 459 in the anode circuit of the tube 457. The −140-volt pulse at point 459 is applied over the capacitor 461 and the point 462 to the cathode of the diode 463, which cathode is at +34 volts. As long as the cathode of the diode 463 is at +34 volts and the anode is at ground potential, there will be no conduction in the diode, and the control electrode of the control tube 468 will remain at substantially ground potential, allowing the tube 468 to conduct. When the −140-volt pulse is applied to the cathode of the diode 463, it will cause the diode to conduct and apply a negative impulse of approximately 96 volts to the control electrode of the control tube 468, causing the control tube 468 to be cut off, thereby deenergizing the solenoid 228. The combination of the resistor 466 and the capacitor 467 allows the negative pulse to be applied quickly to the control tube and enables its effect to be maintained for sufficient time to insure that the solenoid 228 is deenergized and the pawl 229 is completely released before the tube 468 resumes conduction. This effects setting of the auxilary differential mechanism 226 of FIG. 6 in the manner previously described.

At the same time that the conduction of tube 468 is terminated and said tube is cut off, the same negative pulse is applied over the point 480 to the control electrode of the tube 431, thereby also causing the tube 431 to be cut off. This results in the deenergization of the solenoid 484, and the complete release of the pawl 485 before the tube 431 resumes conduction. Release of the pawl 485 sets the comparator number auxiliary differential mechanism, which stores the number sensed, for comparison with the corresponding order of a comparator number manually indexed on the comparator number keyboard 87 (FIG. 3), by means of the keys 88. The comparator number auxiliary differential mechansm and the means for effecting comparison between the comparator number sensed from the card 51 and the number indexed on the keyboard 87 are not shown herein, but are fully described in the previously-mentioned application Serial No. 610,754.

The anode supply circuits for the tubes 457 and 468 are identical to those shown for the tubes 116 and 118 respectively in the previously-mentioned application Serial No. 610,754, and for a detailed description of these circuits, reference may be had thereto.

The operation of the circuit of FIG. 20 as it reads comparator data from a card 51 during the return sweep of the card will now be explained.

Near the end of the in-sweep movement of the card, and after the data has been read therefrom, a relay in the accounting machine (not shown herein but disclosed in application Serial No. 610,754) is energized, and remains energized until near the end of return movement of the card. The energization of this relay opens the contacts R17BC2 to remove the −3-volt bias from the control electrode of the second amplifier tube 457, and closes contacts R17AC2 to connect the control electrode to ground, thereby making the tube 457 normally conducting.

During the return movement of the card 51 past the heads 55, at the data-representing point, where the polarity of magnetization is reversed, a positive pulse of about 0.07 volt is generated in the winding 450, and is applied to the control electrode of the pre-amplifier or first amplifier tube 453, which amplifies and inverts the impulse, and produces a −3.5-volt impulse at point 454. The negative pulse at point 454 is applied to the control electrode of the second amplifier tube 457, which is conducting, and will reduce conduction in the tube to produce a +140-volt impulse at point 459. This positive impulse is applied over the capacitor 461 to point 462 and the cathode of the diode 463, which is at +34 volts. Since the anode of the diode is at ground potential and the cathode is always at +34 volts, the positive impulse will not cause conduction in the diode, and consequently will have no effect on the control tubes 468 or 431, or on the solenoids 228 or 484, controlled thereby.

The positive impulse which is applied to the point 462 is used in the check-back operation. As described in the previously-mentioned application Serial No. 610,754, check-back means are provided to check the entries made into the machine under control of the ledger card 51 against the actual data which is recorded on the card. This provides a check on the operation of the machine, and also provides a check that only one data-representing condition exists in each channel.

These check-back means are represented diagrammatically in FIG. 20 by a set of contacts 501 associated with the solenoid 228, and by a set of contacts 502 associated with the solenoid 484.

As explained earlier, the differential mechanism 220 (FIG. 6) sets the control plate 258 according to the account number read from the ledger card, in response to the energization of the solenoid 228 at a selected time, which in turn sets the auxiliary differential mechanism 226.

Also, in the manner fully disclosed in the previously-cited United States patent application, Serial No. 610,754, the solenoid 484 (FIG. 20) is operable to control the setting of an additional control plate. One solenoid 228 and one solenoid 484, and their corresponding auxiliary differential mechanisms and control plates are provided for each channel of comparator information contained on the ledger card 51.

The setting of these plates involves their positioning about the shaft 186, so that the rise portion between the small diameter, as at 265 (FIG. 6), and the larger diameter as at 266 of each plate, occupies a position about the shaft 186 corresponding to the digit setting of the plate.

The group of contacts 262 (FIG. 6) associated with the control plate 258, and which include the contacts 501 of FIG. 20, are mounted on a bracket 503, which is pivoted on the shaft 186 and is connected by links 504 to an arm (not shown) secured to the drive shaft 199, which drives the auxiliary differential mechanism in synchronism with the movement of the carriage of the accounting machine. The bracket 503, which normally occupies the position shown in FIG. 6, is moved counter-clockwise about the shaft 186 during the counter-clockwise operation of the shaft 199 in the first 180 degrees of operation of the auxiliary cam shaft of the accounting machine, and is returned clockwise to home position when the shaft 199 is rocked clockwise as the auxiliary cam shaft completes its second 180 degrees of operation, from 180 degrees to 360 degrees.

The movement of the card carriage of the accounting machine is synchronized with the movement of the shaft 199, being driven into the machine during the counter-clockwise movement of the shaft 199 and being returned to home position during the clockwise movement of said shaft. The bracket 503, which is also operated by the shaft 199, will move the group of contacts 262 past the related plate 258 in synchronism with the movement of the carriage of the accounting machine.

The clockwise movement of the bracket 503 during the return movement of the carriage, after the data which has been read has been entered into the machine, is used to control the check-back circuit in the following manner.

As best shown in FIG. 6, the group of contacts 262 contains two sets of contacts. An inner set of contacts contains three contact blades, which control the check-back circuit, and an outer set contains two blades, which control recording.

The set of contacts for controlling the check-back circuit will now be considered. The center blade 505 of this set is connected by an adjusting screw 506 to a roller 507 which rides on the periphery of the control plate 258. The blade 505 is so located with respect to the roller 507 that, when the roller is traversing the larger-diameter portion of the plate 258, the center blade 505 engages the outer blade 508, as shown in FIG. 6, and, when the roller 507 is traversing the smaller-diameter portion of the plate 258, the center blade 505 engages the inner blade 509 of the set of contacts 501. However, when the roller 507 is traversing the rise between the two different-diameter portions of the plate 258, which rise is positioned about the shaft 186 according to the digit setting of the plate, the center blade 505 is shifting from one of the blades 508 and 509 to the other, and will engage neither. This arrangement is diagrammatically shown in FIG. 20.

Since this shift will occur at a time which is related to the value of the digit set in the plate 258, it should occur at the same time that the impulse is generated in the head 55, which is reading the same digit representation during the return movement of the carriage.

The check-back circuit, which is controlled by the set of contacts on the bracket 503 and by the reading circuit, is shown in FIG. 20.

The outer and inner blades 508 and 509 are connected together and are connected to the point 462 which, as explained earlier, has a positive pulse of about 100 volts impressed thereon when the data-representing position in the channel is sensed during the return movement of the carriage of the accounting machine. The center contact blade 505 is connected over a point 519 to the anode of a diode 520, which is half of a 6H6 type tube. The cathode of the diode 520 is connected over a point 521 and a 2.7-megohm resistor 522 to a +75-volts source of potential. With the cathode at +75 volts and the anode at +34 volts, the diode 520 will normally be non-conducting and will conduct only when the +140-volt impulse is impressed in its anode as a digit-representing condition in the channel is being read during the return movement of the carriage 111.

The set of contacts 502 controlled by the comparator number control plate (not shown) are similar in structure and operation to the contacts 501, and, as shown in FIG. 20, are connected in parallel to the contacts 501. The contacts 502 include a center contact blade 512, and outer and inner contact blades 513 and 514, respectively. The outer and inner blades 513 and 514 of the set of contacts 502 are connected to the point 462. The center contact blade 512 is connected to the point 519 which, it will be recalled, is connected to the anode of the diode 520.

It will be clear that, since the center blades 505 and 512 shift from contact with their inner blades 509 and 514 respectively to their outer blades 508 and 513 respectively at the digit-representing positions of their respective control plates, this shift occurs when the +140-volt pulse is impressed over the point 462 to the interconnected inner and outer blades 508, 509, and the interconnected inner and outer blades 513 and 514, by the reading circuit, and the impulse does not get through via either of the center blades 505 or 512 to the diode 520. It will be seen that if the pulse is impressed over the point 462 to the inner and outer blades of the sets of contacts 501 and 502 when the center blade 505 or 512 of either of these sets is in contact with either the inner or the outer blades of the respective sets, it indicates that the setting of the control plates does not agree with the data being read from the card 51.

The cathodes of all of the diodes 520 relating to the three comparator channels are connected to the point 521, so that conduction in any one of the diodes will control a control tube 523 to bring about the controls which indicate a lack of agreement between comparator data stored in the machine by the setting of the control plates and the data read from the card during its return sweep.

Point 521 is coupled over a 0.03-microfarad capacitor 524 to the control electrode of the left section of the control tube 523, which is a twin triode of a 6SN7 type. The anode of the left section is connected to ground over a one-megohm resistor 525 and a 0.01-microfarad capacitor 526 in parallel. The cathode of the left section is connected to a —48-volt potential source, and the control electrode of this section is supplied with a bias by being connected over a one-megohm resistor 527 to a —75 volts source of potential. The left section is normally non-conducting.

Point 528 in the anode circuit for the left section is connected to the control electrode of the right section of tube 523, and supplies the control electrode with ground potential so long as the left section is non-conducting. The cathode of the right section is connected to ground, and the anode is connected over a 4700-ohm resistor 529 to the contacts R10A1 of the check-back control relay R10, and over these contacts, a point 530, and the winding of a check-back control relay R10 to a source of +250-volt anode potential. A 0.01-microfarad capacitor 531 is connected across the relay R10 to prevent a high-voltage surge when the relay is deenergized.

The check-back control relay R10 is normally energized and will indicate a check-back failure whenever it is deenergized. Initial energization of the relay is effected by relay contacts R1B1, controlled by a relay (not shown) in the accounting machine, which connects the point 530 to ground over a 15,000-ohm resistor 532. The contacts R1B1 open a short time after power is supplied to the accounting machine and close momentarily in a corrective operation following a check-back failure, to reenergize the relay R10. Energization of the relay R10 closes contacts R10A1 to complete the anode circuit to the right section of the control tube 523, which section will conduct and provide a holding circuit for the relay R10.

If the positive pulse from the card-reading circuit occurs when either of the center blades 505 or 512 is contacting either of the blades 508, 509 or 513, 514, respectively, indicating a check-back failure, the diode 520 will conduct and cause a positive pulse at the point 521. The positive pulse at the point 521 will be effective to cause the left section of the control tube 523 to conduct and supply a negative pulse to the control electrode of the right section to cut off the right section and thereby deenergize the relay R10, which in turn opens the contacts R10A1 to interrupt the anode circuit for the right section of the control tube 523. Once the relay R10 is deenergized, it will remain deenergized until the contacts R1B1 reclose when the relay controlling these contacts is deenergized in the corrective operation of the machine which follows the operation in which the check-back failure occurred. Deenergization of the relay R10 is effective, by means which are fully disclosed in the previously-cited United States application Serial No. 610,754, to energize the gate-check solenoid to effect a gate-check condition of the accounting machine. The manner in which this is accomplished is fully described in the previously-cited application, and therefore will not be explained herein.

In order to disable the check-back control circuit in those operations in which the check-back control is not desired, the right section of the control tube 523 is rendered ineffective to control the relay R10 regardless of any signal which may be applied to its control electrode. This is accomplished by connecting the point 528 to ground over any one of four contacts 535, 536, 537 and 538, in parallel.

The contacts 535 close during a pawl check failure to prevent deenergization of the relay R10 at such a time. The contacts 536 close to prevent energization of the relay R10 while a manual line finding operation is employed. The contacts 537 close to prevent deenergization of the relay R10 during a storage cycle of the accounting machine. The contacts 538 are cam-controlled contacts, which are closed by a cam on the auxiliary cam shaft of the machine at 315 degrees of one operation of the shaft and which remain closed until 225 degrees of the next operation of the shaft. These contacts insure that the check-back circuit will not be effective during the insweep of the card 51 but will only be effective during the return movement of the card carriage of the accounting machine when it is desired to check the setting of the control plates with the data read from the card.

The check-back circuit, therefore, re-reads the card and compares this reading with the setting of the cam plates to insure that the data which was read from the card has been properly entered into the machine.

As an incident to the operation of checking the correctness of the setting of the machine, the check-back circuit will also verify the fact that no more than one digit-representing condition is present in the channel. This stems from the fact that the channels are read from the top to the bottom of the card during the insweep of the card, and the first digit-representing condition which is sensed in the channel will control the setting of the control plates; whereas, the channels are read from the bottom toward the top of the card when the check-back circuit is effective, and any additional digit representation will be sensed first and will occur at a point different from the one which caused the setting of the control plates and will cause the control tube 523 to be cut off and thereby deenergize the relay R10, thus giving a signal that a check-back failure has occurred.

*Manual Line Finding Control Circuits*

The function of the manual line finding control circuits is to enable manual line selection by use of the manual line finding control knob 75 and the manual input switch 76. At the same time, line selection under control of information magnetically stored on the ledger card 51 is disabled.

Figure 17:
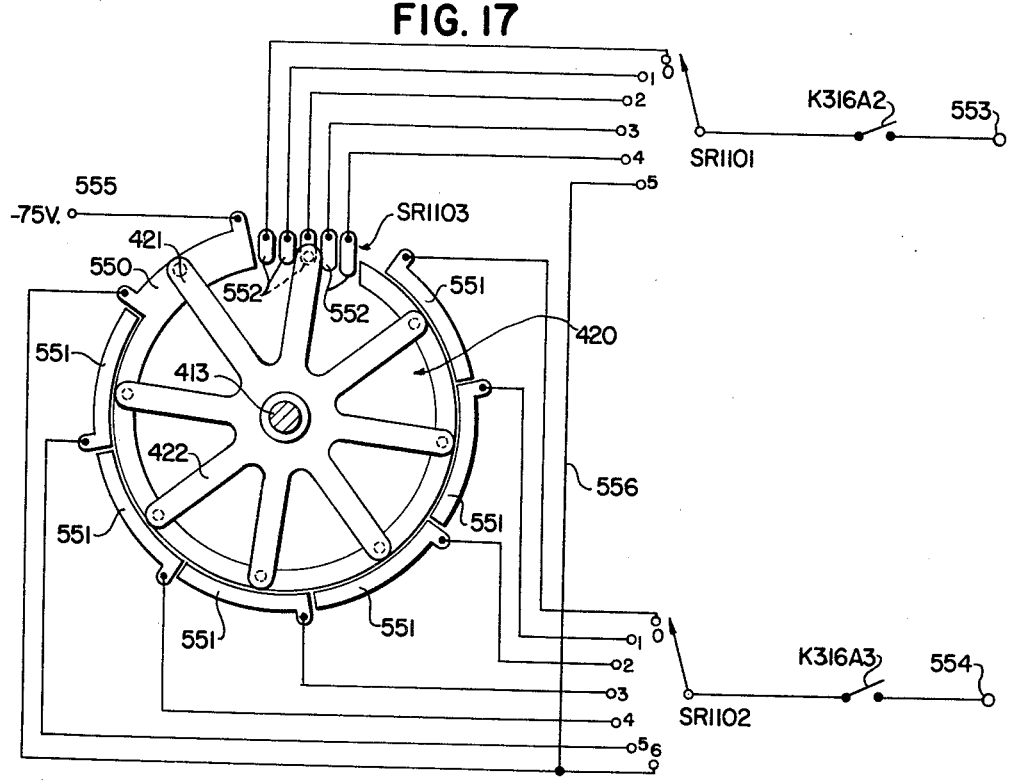
FIG. 17 is a diagrammatic view showing the manual line finding knob switch means, and the manner in which it is connected to other circuit components of the line finding circuitry.

The previously described manual line finding switch which is controlled by the knob 75 is shown diagrammatically in FIG. 17, and is designated generally as SR1103. The switch includes a printed circuit board having thereon a first arcuate area 550 of conductive material which is used as a common, six smaller arcuate areas 551 of conductive material used as multiples output contacts, and five small oval areas 552 of conductive material used as units output contacts. Also comprising part of the switch is the wiper 420 which is rotatably mounted on the shaft 413 so that the contacts of seven of its arms 422 ride on the area 550 used as a common or on one of the areas 552 used as unit output contacts, while the contact of a longer arm 421 rides on one of the areas 551 used as multiples output contacts or on a portion of the area 550 used as a common.

As previously described, the two switch assemblies 430 and 431 (FIGS. 15 and 16) are associated with the manual line finding circuitry. These switch assemblies are shown diagrammatically in FIG. 17 as multiple-position switches SR1101 and SR1102 respectively. Contact positions of these two switches are electrically connected to areas 552 and 551 respectively of the switch SR1101. In addition, the No. 5 contact position of the switch SR1102 are electrically connected to the common area 550 of the switch SR1103. Also, an input terminal 555 is electrically connected to the common area 550.

The wiper of the switch SR1101 is electrically connected over normally open relay contacts K316A2 to a point 553, and the wiper of switch SR1102 is electrically connected over normally open relay contacts K316A3 to a point 554. The points 553 and 554 are connected into the reading and recording circuits (not shown) of the units and multiples line finding channels, respectively, at points corresponding to the point 462 in the comparator reading and recording circuit shown in FIG. 20.

The manner in which the manual line finding circuit of FIG. 17 functions will now be described.

Figure 18:
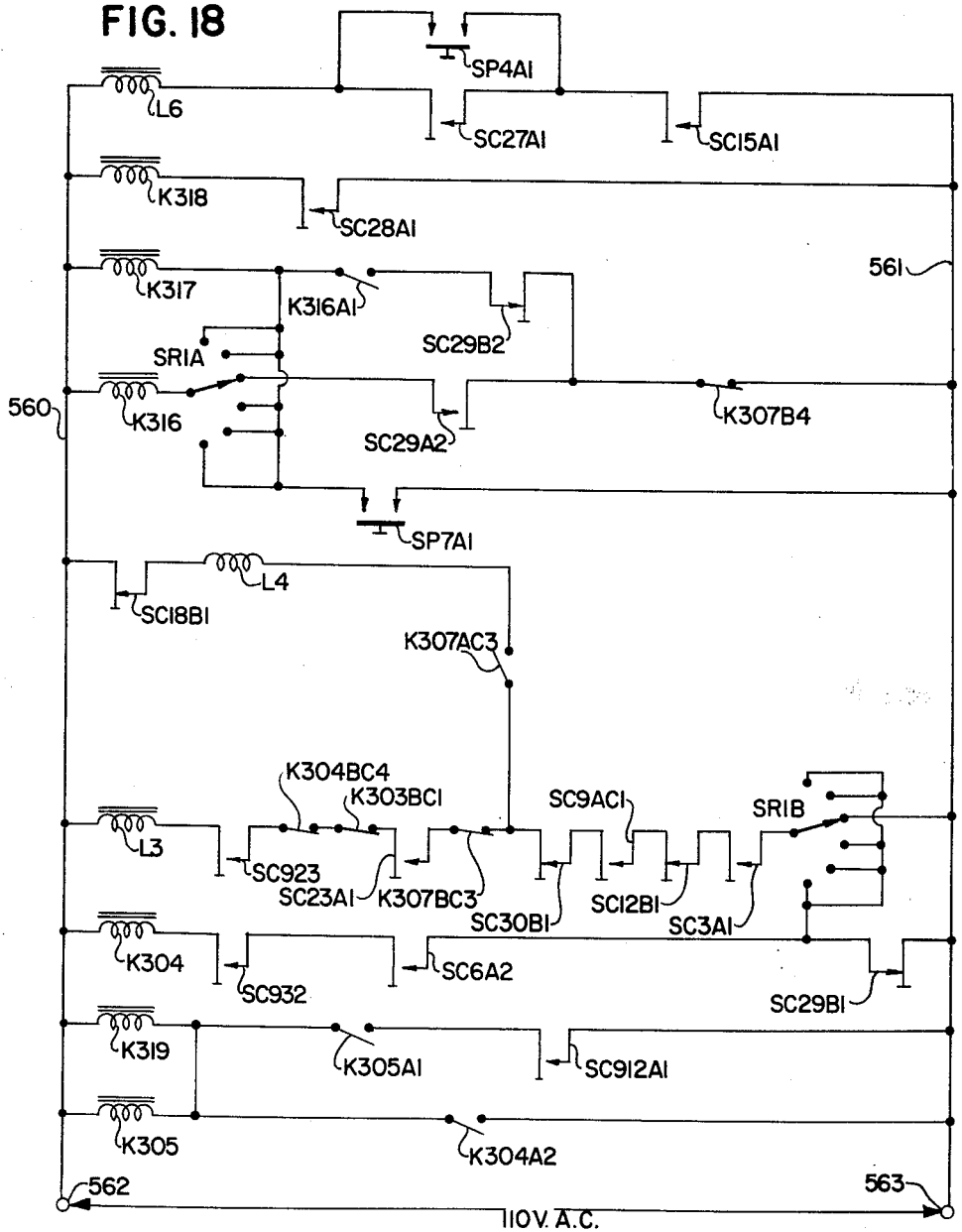
FIGS. 18 and 19 are circuit diagrams showing various control circuitry utilized in the present invention.
Figure 19:
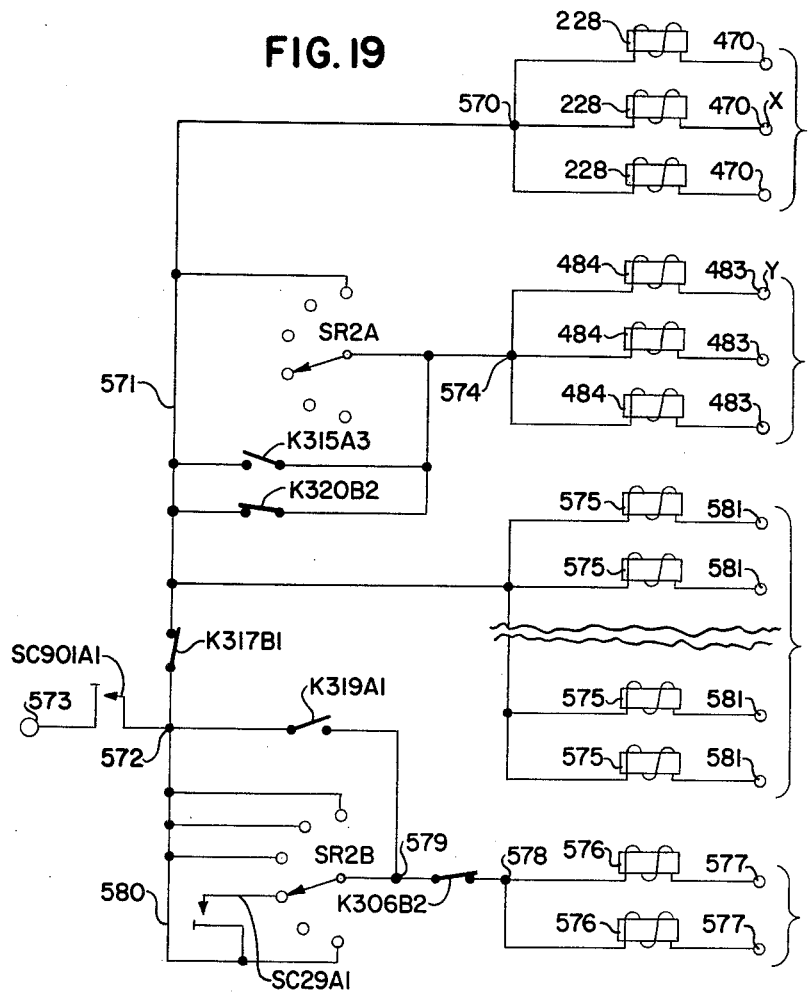

In order to condition the accounting machine for a numerals transfer operation in which the manual line finding operation is used, the numerals transfer "on-off" switch 76 must first be set to its "on" position, and the function control knob 100 must be set to "Transfer" position. Setting the switch 76 to "on" position closes the contacts SC29A1 (FIG. 19) and SC29A2 (FIG. 18) and opens the contacts SC29B1 (FIG. 18) and SC29B2 (FIG. 18). Setting of the function control knob 100 to "Transfer" position positions the switches SR1A and SR1B as shown in FIG. 18, and positions the switches SR2A and SR2B as shown in FIG. 19.

Let it be assumed that the operator desires to select line 38 of the card to be recorded upon. The wiper 420 is then positioned as shown in FIG. 17, so that the long arm 421, as well as six of the seven short arms 422, are on the common area 550, while the other short arm 422 is positioned to the area 552 connected to the No. 2 position of the switch SR1101. The settings of the wiper 420, in terms of the contact positions of the units switch SR1101 and the multiples switch SR1102, to produce a given number are tabulated below:

| Line No. | Units Pos. | Mult. Pos. | Line No. | Units Pos. | Mult. Pos. |
| --- | --- | --- | --- | --- | --- |
| Bal. For | 0 | 0 | 20 | 2 | 3 |
| 1 | 1 | 0 | 21 | 3 | 3 |
| 2 | 2 | 0 | 22 | 4 | 3 |
| 3 | 3 | 0 | 23 | 5 | 3 |
| 4 | 4 | 0 | 24 | 0 | 4 |
| 5 | 5 | 0 | 25 | 1 | 4 |
| 6 | 0 | 1 | 26 | 2 | 4 |
| 7 | 1 | 1 | 27 | 3 | 4 |
| 8 | 2 | 1 | 28 | 4 | 4 |
| 9 | 3 | 1 | 29 | 5 | 4 |
| 10 | 4 | 1 | 30 | 0 | 5 |
| 11 | 5 | 1 | 31 | 1 | 5 |
| 12 | 0 | 2 | 32 | 2 | 5 |
| 13 | 1 | 2 | 33 | 3 | 5 |
| 14 | 2 | 2 | 34 | 4 | 5 |
| 15 | 3 | 2 | 35 | 5 | 5 |
| 16 | 4 | 2 | 36 | 0 | 6 |
| 17 | 5 | 2 | 37 | 1 | 6 |
| 18 | 0 | 3 | 38 | 2 | 6 |
| 19 | 1 | 3 | 39 | 3 | 6 |
|  |  |  | 40 | 4 | 6 |

Closure of the contacts SC29A2 (FIG. 18) by movement of the numerals transfer switch 76 to its "on" position and positioning of the switch SR1A to "Transfer" position by setting of the function control knob completes a circuit extending between conductors 560 and 561 over normally closed relay contacts K307B4, the contacts SC29A2, the switch SR1A, and a relay K316 to energize said relay. The conductors 560 and 561 are connected to terminals 562 and 563, respectively, to which is applied a source of 110 volts A.C. power. Energization of the relay K316 closes the relay contacts K316A2 and K316A3 in the units and multiples line finding circuits of FIG. 17.

The switches SR1101 and SR1102 diagrammatically represent, in FIG. 17, the switch assemblies 430 and 431, the mechanical details of which are shown in FIGS. 15 and 16. It will be recalled that these assemblies are constructed so that the wiper of each assembly sequentially engages the various contacts as the shaft 199 rotates during machine operation. Since the rotation of the shaft 199 is mechanically related timewise to the movement of the carriage table of the accounting machine, a given position of the wipers of the assemblies 430 and 431 with respect to the contacts of said assemblies corresponds to a given position of the table with respect to the machine, and therefore also corresponds to the location of a given magnetic discontinuity on a magnetic strip on a card 51 positioned on the table. Accordingly, it will be seen that the wipers of the switches SR1101 and SR1102 engage their respective contacts in the same time relation as the magnetic strips on a card pass the reading and recording heads 55 of the accounting machine.

Setting of the switch 420 to the desired position completes a path from the —75-volt terminal 555 through the switch 420 to certain contacts of the switches SR1101 and SR1102, depending upon the position of the switch 420. In the example shown, with the switch 420 set for line 38, a path is completed from the terminal 555 to the No. 2 contact of switch SR1101, and to the No. 6 contact of switch SR1102. It will be noted that since the No. 5 contact of switch SR1101 is connected by a conductor 556 to the No. 6 contact of switch SR1102, a path is also completed to said No. 5 contact of the switch SR1101. As will subsequently be clear, this is of no matter, since the wiper of the switch SR1101 engages the No. 2 contact before it engages the No. 5 contact during its regular cyclic movement.

When the moving wipers of the switches SR1101 and SR1102 engage the contacts which are electrically connected to the −75-volt terminal 555 (in this case, the No. 2 contact of the switch SR1101 and the No. 6 contact of the switch SR1102), a path is completed over the contacts K316A2 and K316A3 respectively to the terminals 553 and 554. These terminals are connected into the operating circuits for the pawl magnets for the units and multiples line finding channels. Therefore, when the −75-volt pulse is applied to these terminals, the magnets are deenergized in the same manner as if a magnetic discontinuity on the line finding strips of a card 51 had passed the recording heads 55 for these channels. Deenergization of these magnets releases their pawls to set the auxiliary differential mechanisms for the line finding channels in the manner described in the previously-cited application Serial No. 610,754. The line finding mechanism described in that application is then effective to position the numerals card 58 (FIG. 8) according to the setting of the two auxiliary differential mechanisms.

*Additional Control Circuits*

Some additional control circuits for effecting the functioning desired in the improved accounting machine of the present invention are shown in FIGS. 18 and 19. These circuits are associated with additional circuitry in the accounting machine which has not been changed from circuitry employed in the embodiment of the machine disclosed in the previously-mentioned application Serial No. 610,754. A description of the conventional circuitry will therefore not be repeated herein, but reference may be had to said application for a complete description of such circuitry.

The solenoid L6 shown in FIG. 18 is the disable comparator print solenoid. When energized, this solenoid is effective to disable certain of the printing hammers to prevent printing of an account number on the journal sheet, in the manner shown in FIG. 7, and previously described. It is desired to disable the hammers which are normally effective to print an account number on the journal sheet in the event that the comparator means of the accounting machine is to be disabled, since often in such cases an erroneous account number or comparator number will be sensed from the ledger card 51. Energization of the solenoid L6 is controlled over the circuit which extends from the conductor 560 over the solenoid L6, the contacts SC27A1 in parallel with the contacts SP4A1, and the contacts SC15A1 connected in series to the parallel combination, to the conductor 561. In order to energize the solenoid L6, the disable comparator button 78 (FIG. 3) is depressed, thus closing the contacts SP4A1. This conditions the energizing circuit for the solenoid L6 so that when the contacts SC15A1 close, as they do when the machine is cycled through a balance pickup operation, the solenoid L6 is energized. Energization of the solenoid L6 is effective, as shown in FIG. 7 and previously described, to close the contacts SC27A1, thus completing a holding circuit for the solenoid L6 which will maintain said solenoid in energized condition even though the button 78 is released, thus opening the contacts SP4A1. The energizing circuit for the solenoid L6 remains completed until the contacts SC15A1 open at the end of a balance pickup operation.

The solenoid L6 is also effective to operate the contacts SC28A1 which energize a comparator relay K318 (FIG. 18). This relay is effective through circuitry which has been described in the previously-cited United States patent application Serial No. 610,754 to prevent a short cycle of the accounting machine in which the card 51 is ejected from the machine due to a comparator failure.

The relays K316 and K317 are manual line finding relays, which control various functions including some shown in the present application, and others which are fully illustrated in the previously-cited application Serial No. 610,754. The energizing circuits for these relays have been altered to accommodate the numerals transfer operation, and in the present invention, in order to energize the relay K316 on a numerals transfer operation, the switch SR1A, controlled by the function control knob 100, must be in "Transfer" position, and the contacts SC29A2, controlled by the numerals transfer switch 76, must be closed, which occurs when the numerals transfer switch is in its "on" position. The contacts K307B4 are normally closed relay contacts controlled by the relay K307, which is not shown herein, but which is fully disclosed in the previously-mentioned application Serial No. 610,754.

It will be seen that when the switch SR1A and the contacts SC29A2 and K307B4 are in the condition described above, an energizing circuit for the relay K316 is completed which extends from the conductor 560 over the coils of relay K316, the switch SR1A in its "Transfer" position, the contacts SC29A2, and the contacts K307B4 to the conductor 561. Energization of the relay K316 closes the contacts K316A2 and K316A3 (FIG. 17) which function to permit the manual line finding circuit to be effective to control the positioning of the card carriage to the desired line, as previously described. Energization of the relay K316 also closes the contacts K316A1, which are included in a holding circuit which is effective to retain the relays K316 and K317 in energized condition under proper circumstances. However, the closure of the contacts K316A1 is not effective to complete an energizing circuit for the relay K317 in a numerals transfer operation, since in such an operation the contacts SC29B2, which are in series with the contacts K316A1, are opened due to the placement of the numerals transfer switch 76 in its "on" position. Therefore the relay K317 is prevented from being energized.

The contacts SP7A1, controlled by the "manual input" button 80 (FIG. 3) are effective, when closed by depression of said button, to energize both of the relays K316 and K317 in any operation other than a "transfer" operation, by completion of a circuit which extends from the conductor 560 over the coil of the relay K317, and over the coil of the relay K316 serially connected to the switch SR1A, in parallel combination with the coil of the relay K317, this combination being connected serially over the contacts SP7A1 to the conductor 561. In a transfer operation, the contacts SP7A1, when closed, will effect energization of the relay K317 but not the relay K316, since when the switch SR1A is in "Transfer" position, it interrupts the circuit between the contacts SP7A1 and the relay K316.

In any operation other than a transfer operation, the relay contacts K316A1 complete a holding circuit for both of the relays K316 and K317 after they have been energized through the contacts SP7A1.

Also shown in FIG. 18 are the energizing circuits for the solenoids L3 and L4. The solenoid L3 is effective to release the auxiliary clutch of the accounting machine when it is energized, while the solenoid L4 is effective to trip the key lock line of the accounting machine when it is energized.

For purpose of description of the energizing circuit of the solenoid L3, let it be assumed that the accounting machine operator desires to make a balance pickup operation with the function control knob 100 in its "Posting I" position and the numerals transfer switch 76 in its "off" position. The balance pickup operation is initiated by operation of the pickup bar 81 of the accounting machine. This is effective to energize a relay in the operating circuitry of the accounting machine, which corresponds to the relay R2 in the previously-mentioned application Serial No. 610,754. Since this portion of the operating circuitry is conventional, it is not shown in this application. However, for a description of such circuitry, reference may be had to the prior application. Energization of this relay opens the contacts K303BC1, and is also effective to cause energization of a solenoid, which corresponds to the solenoid designated S6 in the previously-mentioned patent application, Serial No. 610,754. Energization of this solenoid closes the contacts SC23A1 (FIG. 18). When the pickup bar of the accounting machine is released, the relay is deenergized, which causes the contacts K303BC1 (FIG. 18) to close, thus completing an energizing circuit for the solenoid L3, which extends from the conductor 560 over the coil of the solenoid L3, the contacts SC923A1, K304BC4, K303BC1, SC23A1, K307BC3, SC30B1, SC9AC1, SC12B1, SC3A1, the switch SR1B in its "Posting I" position, and the contacts SC29B1, to the conductor 561. The solenoid L3 corresponds to the solenoid S3 in the previously-mentioned application Serial No. 610,754. The various contacts in this energizing circuit represent, among others, a number of interlock means which prevent energization of the solenoid L3 if the accounting machine is not in proper condition for operation. A number of these interlocks are conventional and have been fully disclosed in the prior application. Consequently, they will not be further described here. Among the interlocks which are in addition to the ones described in said application is an interlock to insure that the date mechanism shown in FIGS. 10 and 11 is properly set. It will be recalled that a switch means including contacts SC30B1 is controlled by the setting of the date wheels so that if the date wheels are not properly set, the contacts SC30B1 will be open, and will thus prevent operation of the machine by preventing energization of the solenoid L3. Also, in the event that the numerals transfer switch 76 is in its "on" position during a posting operation, which is an incorrect setting for said switch, the contacts SC29B1 are open, and thereby prevent energization of the solenoid L3.

When the function control knob 100 is in "Transfer" position, the switch SR1B is positioned so that the energizing circuit for the solenoid L3 bypasses the contacts SC29B1 and extends directly to the conductor 561. This permits energization of the solenoid L3 and operation of the accounting machine regardless of the position of the numerals transfer switch 76.

With the function control knob 100 set to any position other than "Transfer," if the machine operator desires to make a machine operation of the type controlled by the various keys in Row 1 or Row 2 of the machine keyboard shown in FIG. 2, the solenoid L4 must be energized. This is accomplished by depression of the selected Row 1 or Row 2 key which acts through circuitry disclosed in the previously-mentioned patent application Serial No. 610,754 to energize a relay in the accounting machine, which is effective to close the contacts K307AC3. The solenoid L4 is then energized over a circuit which extends from the conductor 560 through the contacts SC18B1, the solenoid L4, the contacts K307AC3, SC30B1, SC9AC1, SC12B1, SC3A1, SR1B, and SC29B1 to the conductor 561. In the event that the function control knob 100 is in "Transfer" position, the solenoid L4 is energized over the same path as described above, except that the contacts SC29B1 are by-passed by the switch SR1B, which completes the circuit directly to the conductor 561. Here again, if the date mechanism is improperly set on the accounting machine, the contacts SC30B1 in the energizing circuit will be in an open position, and will prevent energization of the solenoid L4.

Various other energizing circuits are provided for energizing the solenoids L3 and L4 under appropriate circumstances, but since these play no part in the present invention, and are fully disclosed in the previously-mentioned application Serial No. 610,754, they will not be shown or described herein.

The contacts SC29B1 serve an additional function in preventing energization of the storage relay K304 when the numerals transfer switch 76 is in its "on" position. When the numerals transfer switch is in "off" position, the storage relay K304 may be energized under proper circumstances to prepare the machine for a storage cycle by closing of the contacts SC932 and SC6A2, in addition to the contacts SC29B1.

Additional storage relays K305 and K319 (FIG. 18) are also energized by energization of the relay K304, since energization of the relay K304 closes the contacts K304A2 and completes energizing circuits for the relays K305 and K319 which extend from the conductor 560 over the coils of said relays and the contacts K304A2, to the conductor 561.

Energization of the relay K305 in turn closes the contacts K305A1 in a holding circuit for the relays K305 and K319 (FIG. 18).

Accordingly, it will be seen that the relay K304 is inoperative to energize except when the contacts SC29B1 are closed, and that the relays K305 and K319 are inoperative to energize unless the relay K304 is energized. Therefore the contacts SC29B1, controlled by the numerals transfer switch 76, prevent energization of any of these relays except under proper conditions.

Shown in FIG. 19 are certain circuits for controlling the operation of the latch pawl magnets of various auxiliary differentials, corresponding to the various channels of information stored on the magnetic ledger cards 51.

FIG. 19 may be related to the card reading circuits for the various channels by noting that the points 470 and 483, adjacent the magnets 228 and 484 (FIG. 20) relating to the comparator channels, are shown in a similar relation in FIG. 19. Also, it may be noted that the circuits of FIG. 19 relating to the comparator circuit channels continue to the source of +250-volts potential and are represented in FIG. 20 by the arrows to the right of the magnets 228 and 484.

It will be seen that the magnets 228, which are connected to one end to points 470, are arranged in parallel combination, with said combination being connected at point 570 to a common 571, which in turn is connected through normally open contacts K317B1 to a point 572. Contacts SC991A1 connect the point 572 to a +250-volt terminal 573.

The magnets 484 are arranged in parallel combination between the points 483 and a point 574. Three different parallel circuit paths are provided between the point 574 and the common 571. A first path extends through the switch SR2A, controlled by the function control knob 100 of the accounting machine, and is connected so that this path is completed only when the function control knob 100 is in "Install" position. A second path extends through the normally open contacts K315A3, which are controlled by a relay K315 in the accounting machine, and a third path extends through the normally closed contacts K320B2, controlled by relay K320 in the accounting machine. The operating circuits for controlling the relays K315 and K320 are described in the previously-mentioned United States patent application Serial No. 610,754.

A plurality of magnets 575, one for each amount information channel on the cards 51, are connected in parallel combination between points 581, which are associated with the card reading circuits for the amount channels, and the common 571.

Two magnets 576, one for each line finding channel on the cards 51, are connected in parallel combination between points 577, which are associated with the card reading circuits for the line finding channels, and a point 578. Normally closed contacts K306B2, controlled by a relay in the accounting machine circuitry (not shown), connect the point 578 to another point 579, from which a plurality of circuit paths extend to the point 572, or to a common 580 connected thereto.

A first circuit path between the points 572 and 579 includes normally open contacts K319A1, which are controlled by the relay K319 (FIG. 18). The circuit paths extending between the point 579 and the common 580 are associated with various contact positions of the multiple-position switch SR2B controlled by the function control knob 100, the wiper of said switch being connected to the point 579. The contact positions of the switch SR2B corresponding to the "Add," "Install," "Posting I," and "Posting II" settings of the function control knob are connected directly to the common 580. The contact position corresponding to the "Transfer" position of the function control knob is connected through the contacts SC29A1, controlled by the numerals transfer switch 76, to the common 580.

The control circuits of FIG. 19 for the comparator magnets 484 and for the amount magnets 575 operate in substantially the same manner as disclosed for these magnets in the previously-cited United States patent application Serial No. 610,754.

With regard to the magnets 228 controlling the comparator print auxiliary differential mechanisms, it may be seen from FIG. 19 that the circuits for controlling these magnets are such that the +250-volt potenial is applied to points 470 whenever both the relay contacts K317B1 and the contacts SC901A1 are closed. The contacts SC901A1 are controlled by the auxiliary cam line of the accounting machine and are closed between 5 degrees and 355 degrees of the operation cycle of that cam line.

With regard to the line finding magnets 576, it will be seen that the contacts K306B2 must in all events be closed for a +250-volt potential to be applied over the magnets 576 to the points 577 in the card reading circuits for the line finding auxiliary differential mechanisms. It will furthermore be seen that this potential will be applied to the points 577 only between 5 degrees and 355 degrees of cycling of the auxiliary cam line, due to the timing of the contacts SC901A1, as described above. When the function control knob 100 is in any position other than "Transfer" position, and the contacts SC901A1 and K306B2 are closed, the +250-volt potential will be applied to the points 577 through the switch SR2B. With the function control knob in "Transfer" position, the contacts SC29A1, controlled by the numerals transfer switch 76, must be closed in order for potential to be applied to the points 577. In a normal transfer operation, in which the numerals transfer switch 76 is in "off" position, no potential is applied to the points 577, since no line finding selection is made in an operation of this type. In this instance, the potential is prevented from being applied to the points 577 by the open contacts SC29A1. However, when a numerals transfer operation is made, the numerals transfer switch 76 is placed in "on" position, and the contacts SC29A1 are consequently closed. In this case, the +250-volt potential is applied to the points 577 over a circuit which extends from the terminal 573 through the contacts SC901A1, SC29A1, the "Transfer" position of the switch SR2B, the contacts K306B2, and the coils of the magnets 576, to the points 577. This enables a manual line finding operation to take place in connection with a numerals transfer operation.

In addition, the contacts K319A1 are provided between the points 572 and 579, so that in certain storage operations, the potential of +250 volts can be applied from the terminal 573 to the points 577 over the contacts SC901A1, K319A1, K306B2, and the coils of the magnets 576.

Numerals Transfer Operation

The structure described in the present application enables the performance of a "numerals transfer" operation, which differs from any operation which the accounting machine disclosed in the previously-mentioned application Serial No. 610,754 had the capacity to perform. This capability of the accounting machine of the present invention is provided to satisfy the requirements of an accounting system utilized in certain businesses, which requires the generation of additional records by the accounting machine. Specifically, the present invention provides means to enable the accounting machine to record on a record member similar to that shown in FIG. 8, hereinafter called a numerals card, information including an amount or balance and the date of the entry.

This is accomplished by setting the accounting machine for a "Transfer" operation by proper positioning of the function control knob 100 in the manner described in the previously-mentioned application Serial No. 610,754, and then moving the numerals transfer switch 76 to its "on" position.

Location of the function control knob 100 in "Transfer" position sets the switches SR1A and SR1B (FIG. 18) and the switches SR2A and SR2B (FIG. 19) to the positions shown. The switch SR1A in this position prepares an energizing circuit for the relay K316, while the switch SR1B by-passes the contacts SC29B1. The switch SR2A in this position disables one energizing path for the comparator magnets 484, while the switch SR2B prepares a +250-volt supply to the plate circuit for energizing the line finding magnets 576.

Moving the switch 76 to "on" position closes the contacts SC29A1 (FIG. 19) to complete the +250-volt plate supply circuit for the line finding magnets 576. Also, the contacts SC29B1 open, but since these contacts are by-passed by the switch SR1B, this has no effect on energization of the solenoids L3 and L4. It does, however, prevent energization of the storage relay K304. The contacts SC29A2 close to complete an energizing circuit for the relay K316, while the contacts SC29B2 open to interrupt a holding circuit for the relay K316 and its associated relay K317, and to prevent the relay K317 from energizing during a numerals transfer operation.

The manual line finding knob 75 may be set at this time to the desired line which is to be printed upon the numerals card.

A regular statement ledger card 51 containing a record of one of the accounts for which it is desired to produce a numerals card 58 is inserted into the machine at this time, and the balance pickup bar 81 is depressed to initiate a pickup cycle of machine operation. As previously described, the pickup cycle is initiated by energization of the solenoids L3 and L4 under control of the pickup bar 81. As also previously described, the date mechanism must be properly set or the contacts SC30B1 will be open and will prevent energization of the solenoids L3 and L4.

The pickup cycle of operation of the machine is completed in the usual manner, with amount and sign of the balance and account number information being picked up from the card 51. In addition, the line information is "picked up" from the setting of the manual line finding knob 75.

The ledger card 51 is then removed from the machine, and a numerals card 58 (FIG. 8) is inserted in its place. To effect printing of the desired information on the numerals card, the new balance key on the accounting machine keyboard is depressed to cycle the machine again.

In this operation of the machine, a portion of the ledger card printing mechanism is disabled, so that printing takes place only utilizing those type wheels located to print upon the numerals card 58. It will be recalled that this disabling mechanism, shown in FIG. 12, has been previously described. The printing mechanism for printing upon the journal strip 94 is not affected by this.

A new balance operation in this instance does not include a storage cycle for the storage of new balance and other information on the ledger card 51, as is otherwise the case in normal posting operations of the machine, since it is the numerals card 58 which is being printed upon. The storage cycle is prevented by the open contacts SC29B1, which prevent energization of the storage relay K304, and through it, energization of the storage relays K305 and K319.

At the end of the new balance operation, the numerals card 58, bearing proper amount information on the selected line, is released by the machine. Another ledger card 51, bearing information pertaining to another account, may then be inserted into the machine for pickup of information to be transferred to a corresponding numerals card 58, and so on, until recording on all of the numerals cards for the various accounts has been completed.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, capable of performing a plurality of different types of accounting operations, a machine operating circuit comprising, in combination, a pair of terminals to which a source of electrical power may be applied; a first relay for controlling certain machine functions; a second relay for controlling certain other machine functions; first switching means having a wiper and a plurality of contact positions to which the wiper may be set in accordance with the type of operation desired to be performed by the accounting machine; operation control means for causing the machine to perform one type of operation; second switching means controlled by the operation control means, and being normally open but being closed when the operation control means is operated to cause the machine to perform said one type of operation; third switching means controlled by the operation control means, and being normally closed but being open when the operation control means is operated to cause the machine to perform said one type of operation; fourth manually operable switching means; fifth switching means controlled by said first relay to close when said relay is energized; a first circuit path extending from one of said terminals through said first relay to the wiper of said first switching means; a second circuit path extending from one of the contact positions of the first switching means through the second switching means to the other of said terminals; a third circuit path extending from said one of said terminals through said second relay, through certain contact positions of the first switching means, and through the fourth switching means to the other of said terminals; and a fourth circuit path extending from a point on the third circuit path between said second relay and said first switching means through said fifth switching means and said third switching means to the other of said terminals, whereby when the first switching means is set to said one contact position and the operation control means is operated, said first relay is energized but said second relay is not, and whereby when the first switching means is set to a contact position other than said one position, and said fourth switching means is operated, both said first and said second relays are energized, the fourth circuit path providing a holding circuit for maintaining the first and second relays in energized condition except when the operation control means has been operated.

2. In a machine of the class described capable of performing a plurality of different types of accounting operations, a machine operating circuit comprising, in combination, a pair of terminals to which a source of electrical power may be applied; a first relay for controlling certain machine functions; a second relay for controlling certain other machine functions; first switching means having a wiper and a plurality of contact positions to which the wiper may be set in accordance with the type of operation desired to be performed by the accounting machine; operation control means for causing the machine to perform one type of operation; second switching means controlled by the operation control means, and being normally open but being closed when the operation control means is operated to cause the machine to perform said one type of operation; third manually operable switching means; a first circuit path extending from one of said terminals through said first relay to the wiper of said first switching means; a second circuit path extending from one of the contact positions of the first swicthing means through the second switching means to the other of said terminals; a third circuit path extending from said one of said terminals through said second relay, through the other contact positions of the first switching means and through the third switching means to the other of said terminals, whereby when the first switching means is set to one contact position and the operation control means is operated, said first relay is energized but said second relay is not, and whereby when the first switching means is set to a contact position other than said one condition, and said third switching means is operated, both said first and said second relays are energized; and manual indexing means controlled by said first relay to be rendered operable when said first relay is energized.

3. In a machine of the class described, capable of performing a plurality of different types of accounting operations, a machine operating circuit comprising, in combination, a pair of terminals to which a source of electrical power may be applied; a first relay for controlling certain machine functions; a second relay for controlling certain other machine functions; first switching means having a wiper and a plurality of contact positions to which the wiper may be set in accordance with the type of operation desired to be performed by the accounting machine; operation control means for causing the machine to perform one type of operation; second switching means controlled by the operation control means, and being normally open but being closed when the operation control means is operated to cause the machine to perform said one type of operation; third manually operable switching means; a first circuit path extending from one of said terminals through said first relay to the wiper of said first switching means; a second circuit path extending from one of the contact positions of the first switching means through the second switching means to the other of said terminals; and a third circuit path extending from said one of said terminals through said second relay, through the other contact positions of the first switching means, and through the third switching means to the other of said terminals; whereby when the first switching means is set to said one contact position and the operation control means is operated, said first relay is energized but said second relay is not, and whereby when the first switching means is set to a contact position other than said one position, and said third switching means is operated, both said first and said second relays are energized.

4. In a machine of the class described, capable of performing a plurality of different types of accounting operations, a machine operating circuit comprising, in combination, a pair of terminals to which a source of electrical power may be applied; an operating solenoid for effecting operation of the machine under certain circumstances; first switching means having a wiper and a plurality of contact positions to which the wiper may be set in accordance with the type of operation desired to be performed by the accounting machine; second switching means operable to prevent energization of the operating solenoid; interlock switching means for preventing energization of the operating solenoid in the event of improper indexing of information into the machine; a first circuit path extending from one of said terminals through the operating solenoid and the interlock switching means to the wiper of the first switching means; a second circuit path extending from one of the contact positions of the first switching means to the other of said terminals; and a third circuit path extending from the remainder of the contact positions of the first switching means through the second switching means to the other of said terminals, whereby operation of the second switching means is effective to prevent energization of the operating solenoid except when the wiper of the first switching means is set to said one contact position, and whereby the operating solenoid may be energized only when indexing of information into the machine has been properly carried out, so that the interlock switching means is not in solenoid-disabling condition.

5. In an apparatus for keeping ledger accounts on ledger cards, first and second types of ledger cards being required for each account, said cards having balance and related data printed thereon, said data also being magnetically encoded on the first type of said cards, said apparatus including totalizers, means to operate the totalizers to enter amounts therein and withdraw amounts therefrom, and card-positioning means, the combination comprising printing means controlled by the totalizers and capable of printing information on both types of said cards in a plurality of locations; manual line-selecting means for selecting a line for printing on the second type of card; conditioning means to condition the apparatus for an operation in which certain information is printed by the printing means on the second type of ledger card; first means controlled by the conditioning means for disabling a portion of the printing means at a given time for proper printing on the second type of ledger card; and second means controlled by the conditioning means for rendering the manual line selecting means effective to control the positioning of the second type of ledger card to cause printing on said second type of ledger card on the selected line.

6. In an apparatus for keeping ledger accounts on ledger cards, first and second types of ledger cards being required for each account, said cards having balance and related data printed thereon, said data also being magnetically encoded on the first type of said cards, said apparatus including totalizers, means to operate the totalizers to enter amounts therein and withdraw amounts therefrom, and card-positioning means, the combination comprising printing means controlled by the totalizers and capable of printing information on both of said types of cards in a plurality of locations; manual line-selecting means for selecting a line for printing on the second type of card; conditioning means to condition the apparatus for an operation in which certain information is printed by the printing means on the second type of ledger card; means controlled by the conditioning means for disabling a portion of the printing means in operations in which printing is to take place on the second type of ledger card; relay means for rendering the manual line-selecting means effective to control positioning of the second type of ledger card to cause printing on said second type of ledger card on the selected line; and switching means controlled by the conditioning means and operable to energize the relay means to render the manual line-selecting means effective to select a line for printing on the second type of ledger card when the conditioning means is operated to condition the machine for an operation in which information is to be printed by the printing means on the second type of ledger card.

7. In an apparatus for keeping ledger accounts on ledger cards, first and second types of ledger cards being required for each account, said cards having balance and related data printed thereon, said data also being magnetically encoded on a first type of said cards, said apparatus including totalizers, means to operate the totalizers to enter amounts therein and withdraw amounts therefrom, and card-positioning means, the combination comprising printing means controlled by the totalizers and capable of printing information on both of said types of cards in a plurality of locations; manual line-selecting means for selecting a line for printing on the second type of card; function control means settable to a given position to cause the apparatus to perform a printing operation on the second type of ledger card; conditioning means to condition the apparatus for the printing of certain information by the printing means on a selected line of the second type of ledger card; means controlled by the conditioning means for disabling a portion of the printing means in operations in which printing is to take place on the second type of ledger card; relay means for rendering the manual line-selecting means effective to control positioning of the second type of ledger card to cause printing on said second type of ledger card on the selected line; and switching means controlled by the conditioning means and operable to energize the relay means to render the manual line-selecting means effective during operations in which the function control means is set to said given position.

References Cited in the file of this patent

UNITED STATES PATENTS

| | | |
|---|---|---|
| 1,854,216 | Muller | Apr. 19, 1932 |
| 2,114,604 | Mehan | Apr. 19, 1938 |
| 2,438,036 | Carroll et al. | Mar. 16, 1948 |
| 2,562,172 | Campos | July 31, 1951 |
| 2,636,435 | Goodbar | Apr. 28, 1953 |
| 2,884,852 | Salz | May 5, 1959 |
| 2,909,995 | Hannibal | Oct. 27, 1959 |
| 2,947,475 | Rauch | Aug. 2, 1960 |

UNITED STATES PATENT OFFICE
CERTIFICATE OF CORRECTION

Patent No. 3,067,930                      December 11, 1962

Chester N. Jorgensen et al.

It is hereby certified that error appears in the above numbered patent requiring correction and that the said Letters Patent should read as corrected below.

Column 1, line 24, for "continuuos" read -- continuous --; column 8, line 68, for "steam" read -- stem --; column 11, line 27, for "solenoid" read -- solenoids --; column 13, line 72, for "theese" read -- these --; column 20, line 29, for "dode" read -- diode --; column 21, line 39, for "mechansm" read -- mechanism --; column 25, line 62, after "switch" insert -- SR1101 and the No. 6 position of the switch --; column 30, line 48, for "to", first occurrence, read -- at --; column 31, line 31, for "potenial" read -- potential --; column 34, line 13, for "swicthing" read -- switching --.

Signed and sealed this 25th day of June 1963.

(SEAL)
Attest:

ERNEST W. SWIDER
Attesting Officer

DAVID L. LADD
Commissioner of Patents